United States Patent
Martch et al.

(10) Patent No.: US 9,641,833 B2
(45) Date of Patent: May 2, 2017

(54) PROGRAMMING DISRUPTION DIAGNOSTICS

(71) Applicant: Echostar Technologies L.L.C., Englewood, CO (US)

(72) Inventors: Henry Gregg Martch, Parker, CO (US); Edmund Petruzzelli, Centennial, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

(21) Appl. No.: 15/298,068

(22) Filed: Oct. 19, 2016

(65) Prior Publication Data

US 2017/0041600 A1    Feb. 9, 2017

Related U.S. Application Data

(63) Continuation of application No. 14/584,057, filed on Dec. 29, 2014, now Pat. No. 9,503,714.

(51) Int. Cl.
  *H04N 17/02* (2006.01)
  *H04N 17/04* (2006.01)
  H04N 21/61 (2011.01)

(52) U.S. Cl.
  CPC .......... *H04N 17/04* (2013.01); *H04N 17/045* (2013.01); *H04N 21/6143* (2013.01); *H04N 21/6193* (2013.01)

(58) Field of Classification Search
  CPC ............... H04N 17/04; H04N 21/6143; H04N 21/4425; H04N 21/4263; H04N 21/6193
  USPC ........................................................ 348/189
  See application file for complete search history.

(56) References Cited

U.S. PATENT DOCUMENTS

| | | | |
|---|---|---|---|
| 5,808,583 A | 9/1998 | Roberts | |
| 6,580,452 B1 | 6/2003 | Gangitano | |
| 9,503,714 B2 | 11/2016 | Martch et al. | |
| 2006/0038923 A1* | 2/2006 | Dinwiddie | H04N 5/4401 348/569 |

(Continued)

OTHER PUBLICATIONS

U.S. Appl. No. 14/584,057, filed Dec. 29, 2014 Non-Final Rejection mailed Dec. 30, 2015, all pages.

(Continued)

*Primary Examiner* — Michael Lee
(74) *Attorney, Agent, or Firm* — Kilpatrick Townsend & Stockton LLP

(57) ABSTRACT

Various arrangements for monitoring and utilizing solar conjunction events are presented. An occurrence of a solar conjunction event caused by the sun being substantially aligned with the satellite antenna through which a television receiver receives signals from one or more satellites may be monitored. A prediction of a future solar conjunction event based on the monitored occurrence of the solar conjunction event may then be calculated. A second occurrence of the solar conjunction event may be monitored. It may be determined that the second occurrence of the solar conjunction event does not match the calculated prediction of the future solar conjunction event within a threshold range. One or more features of the television receiver may be disabled in response to determining that the second occurrence of the solar conjunction event does not match the calculated prediction of the future solar conjunction event within the threshold range.

20 Claims, 14 Drawing Sheets

(56) References Cited

U.S. PATENT DOCUMENTS

| | | |
|---|---|---|
| 2007/0093210 A1 | 4/2007 | Kochanski et al. |
| 2013/0101274 A1* | 4/2013 | Nguyen .................. H04N 5/76 386/292 |
| 2014/0189756 A1* | 7/2014 | Beals ................. H04N 21/6193 725/68 |
| 2016/0191913 A1 | 6/2016 | Martch et al. |

OTHER PUBLICATIONS

U.S. Appl. No. 14/584,057, filed Dec. 29, 2014 Non-Final Rejection mailed May 5, 2016, all pages.
U.S. Appl. No. 14/584,057, filed Dec. 29, 2014 Notice of Allowance mailed Aug. 25, 2016, all pages.

* cited by examiner

PROGRAMMING DISRUPTION DIAGNOSTICS

CROSS-REFERENCE TO RELATED APPLICATIONS

This application is a continuation of U.S. application Ser. No. 14/584,057, filed Dec. 29, 2014, the disclosure of which is incorporated by reference herein in its entirety.

BACKGROUND

Television programming received from a satellite may be disrupted due to network issues, equipment failure, weather conditions, and other causes. Such a disruption of a programming stream may be frustrating to users. Users may try to navigate or tune to unavailable programming streams only to find blank screens and no programming. Frustrated users may often contact customer support trying to resolve the issue when in many cases the disruption may be only temporary. Likewise, users may stop watching programming after a minute of programming disruption even if the disruption may only last two minutes.

SUMMARY

In some embodiments, a television receiver system configured to monitor outages is presented. The television receiver system may include one or more tuners. The television receiver system may include one or more processors. The television receiver system may include a memory communicatively coupled with and readable by the one or more processors and having stored therein processor-readable instructions which, when executed by the one or more processors, may cause the one or more processors to allocate a tuner for monitoring operations. The instructions may further cause the one or more processors to monitor, using the tuner, a signal strength of a programming stream and determine predicted characteristics of a subsequent disruption. The instructions may further cause the one or more processors to monitor, using the tuner, the signal strength characteristics of the subsequent disruption and determine if the signal strength characteristics during the subsequent disruption match and the predicted characteristics. In response to determining that the signal strength characteristics do not match the predicted characteristics, the television receiver may be disrupted.

In some embodiments the receiver may output for display, to the user, a notification that the receiver has been disrupted. In response to determining that the signal strength characteristics match the predicted characteristics, the receiver may schedule the monitoring of a future disruption. In some embodiments the tuner may be allocated based on usage characteristics of the receiver and signal strength characteristics may include a start time and end time of the disruption. In some embodiments wherein the signal strength characteristics may also include a relative start time and end time of the disruption for signals for two or more satellites. The instructions may further cause the one or more processors to alert a service provider of potential account packing activities when the monitored and predicted characteristics do not match.

In some embodiments, a method for monitoring programming outages using a television receiver is presented. The method may include allocating a tuner for monitoring operations and monitoring, using the tuner, signal strength characteristics during a disruption. The method may include determining predicted characteristics of a subsequent disruption and monitoring, using the tuner, the signal strength characteristics during the subsequent disruption. The method may also include determining if the signal strength characteristics during the subsequent disruption match and the predicted characteristics and in response to determining that the signal strength characteristics do not match the predicted characteristics, disabling the television receiver.

In some embodiments, a non-transitory processor-readable medium for monitoring programming outages is presented. The medium may include processor-readable instructions configured to cause one or more processors to allocate a tuner for monitoring operations. The tuner may one of a plurality of tuners. The medium may include instructions to monitor, using the tuner, a signal strength characteristics during a disruption and determine predicted characteristics of a subsequent disruption. The medium may also include instructions to monitor, using the tuner, the signal strength characteristics during the subsequent disruption and determine if the signal strength characteristics during the subsequent disruption match and the predicted characteristics hold. In response to determining that the signal strength characteristics do not match the predicted characteristics the television receiver may be disabled.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
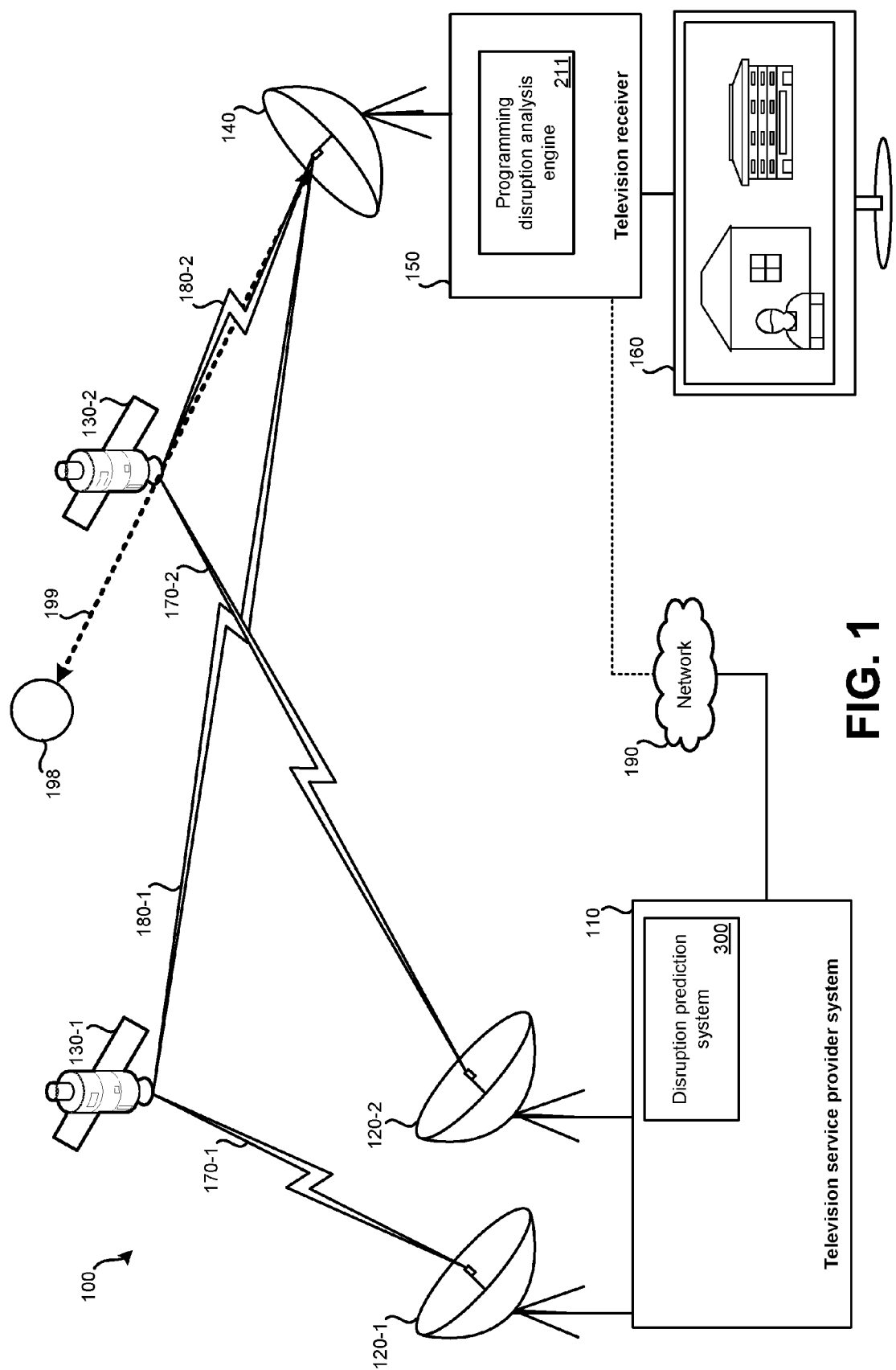
FIG. 1 illustrates an embodiment of a satellite television distribution system.

Satellite based television systems may distribute programming streams to users' receivers via one or more satellites. On occasion, the programming streams may experience disruptions. Disruptions may be due to signal obstructions due to weather conditions, foliage, solar events, or other causes. In some cases, disruptions in programming streams may be due to network problems, hardware failures, and/or satellite uplink problems. The disruptions may affect only a partial list of the programming streams available to a television receiver and may be temporary or transient lasting several seconds or minutes. Some disruptions, such as hardware failures, for example, may be almost completely unpredictable. Other disruptions, such as disruptions related to solar conjunctions may occur at very specific and predictable times. Other disruptions, due to weather conditions for example, may only be partially predictable since weather patterns may often quickly shift or change unexpectedly.

The disruptions may in many instances be unavoidable and not associated with a problem at the service provider. Users who have receivers that experience programming disruptions may often direct their frustration at a service provider even if the disruption is not preventable. The user experience and expectations before, during, and after a programming disruption may be improved by providing the user with notifications, alerts, and data regarding current disruptions, possible future disruptions, and past disruptions. The notifications may include information about causes or reasons for disruptions, expected time and duration of disruption, and/or alternative available programming that is currently available to the user. Identifying the cause of the disruption and providing the user with alternative programming may improve the user's experience and avoid unwarranted frustration directed at the service provider.

For example, severe weather conditions such as heavy rain or dense cloud cover may block or attenuate a satellite signal. An antenna mounted on a user's residence, for example, may be unable to receive a signal through the rain or cloud cover. The disruption may be temporary, and may resolve once the weather passes. During this time, programming associated with the attenuated satellite signal may be unavailable when users try to tune to the programming on their receivers. In general, such weather disruptions cannot be controlled by the service provider. In some cases the cause of the disruption may be non-obvious to a user since the weather may not be currently affecting the user but may be miles away. Depending on the azimuth angle of the satellites providing the programming streams, the satellites' transmissions may be affected while others may be at an angle or position such that they are not affected by the disruption.

In another example, solar events such as a solar conjunction may affect the reception of satellite signals. A solar conjunction may occur when the sun is directly in line with a satellite from which the receiving antenna is receiving a signal and the receiving antenna at a customer's location. Such a solar conjunction may also occur when the sun is approximately in line with the satellite and the receiving antenna (such as within 5, 10, or 15 degrees). Therefore, during a solar junction, as defined herein, a roughly straight line could be drawn from a receiving dish, to a satellite from which the receiving dish is receiving a signal, and to the sun. The location of the sun in the sky is predictable for a geographic location and the locations of the satellites from which the receiving dish receives signals can be determined with accuracy. Therefore, when a solar conjunction should occur for a particular geographic location can be determined with accuracy. Thus, disruptions related to a solar conjunction are predictable. The timing, expected duration, and/or other characteristics of the disruption may be determined ahead of the actual disruptions.

In yet another example, weather or hardware failures may affect the transmission and programming distribution network. Uplink stations, or stations that send programming streams to satellites may themselves experience problems. A hardware failure at the uplink station may disrupt some programming. In such cases, the solution to the disruption may be controlled by the service provider and the service provider may be able to mitigate the disruption by diverting data transfer to other uplink stations, replacing hardware, and the like.

In many cases, a programming outage may be anticipated and/or confirmed by a receiver or the service provider. Based on the signal strength characteristics, information from local weather forecasts, information from other receivers in the geographic area, and/or other information, the cause of the disruption may be diagnosed. The user may be notified of the cause of the disruption. The user may be provided with an estimate of the expected duration of the disruption. In some other instances, the user may be provided with alternative programming options.

In some embodiments, the television receiver may diagnose the cause of the disruption. A television receiver may monitor the received signal strength and monitor and/or save the trends or changes in the signal strength. As the signal strength fades or is reduced below a threshold the television receiver may initiate a procedure to determine the cause of the signal degradation. In some embodiments the television receiver may include predefined templates with saved signatures of a fading signal. The templates or saved signatures may be associated with or indicative of a one or more possible causes of the signal fade. In embodiments, the television receiver may compare the saved signal strength trends to the predefined templates or signatures. The closest matching template or a set of closely matching templates or signatures may be used to help diagnose the cause of the signal strength degradation and/or predict the duration. The television receiver may display or alert the user to the possible causes of the signal degradation and/or duration allowing the user to plan for the disruption or mitigate the disruption. Templates may be defined and/or include specific rates of degradation, accelerations of degradation and/or other changes in signal strength patterns. The signal degradation may therefore be diagnosed by the television receiver independently even if the television receiver does not have communication with the service provider.

For some predictable disruption events, the television receiver may include a table of scheduled or predicted times, dates, durations, and other info related to the disruption. In some cases the occurrence of the disruptions may defined by a formula or a method that allows calculation of the occurrence using the last known occurrence. For example, disruptions due to solar conjunction events occur in predictable intervals typically twice a year. The predicted occurrence of the events may be stored in a table that identifies the expected date of the disruption. The television receiver may track the current time and date and determine, using the table, when the disruption is likely to occur.

In some embodiments, a user's television receiver may allocate tuners of a receiver to continuously, periodically, randomly, or the like, scan and monitor the signal strength of programming streams from a satellite. The tuners may be allocated according to a user's usage characteristics. The receiver may be configured to receive alerts, weather information, disruption forecasts, and other information from the service provider via the tuner or other communication channel. The received information and/or the signal strength of programming streams may be used to diagnose the cause of the disruption. The monitoring and diagnosis of the disruptions may be performed in the background by the system such as while a user is watching and/or recording other programming. The receiver may maintain a data set of the status of programming streams and notify the user of the disruption and/or cause when the user attempts to tune to or record the disrupted programming stream. The diagnosis of the disruption and notification to the user may improve the user's experience and reduce frustration when disruptions occur.

In some embodiments, data from one or more receivers related to signal strength of programming streams may be transmitted to a service provider. The service provider may use data from the receivers to determine or predict disruption trends, geographical areas experiencing disruptions, expected signatures associated with disruptions and other characteristic data. In some embodiments, programming disruption data received by the service provider may be used to detect fraudulent activity such as account packing. In some cases, users may fraudulently receive programming authorization or programming streams from remote tuners that may be located in a remote location from the user. For instance, remote tuners may fraudulently transmit programming streams to multiple remote users while paying only for one user. Or, a user may indicate to a television service provider that a television receiver is to be installed at a first location (e.g., as part of a home that already pays a subscription fee), but actually install the television receiver at a second location (e.g., another house). Receivers or users that fraudulently receive such programming may be detected by monitoring programming disruptions and comparing programming disruptions with receivers in the same geographic location. Service providers may receive programming disruption information from receivers. The service provider may analyze expected programming disruption based on reported programming disruptions in a specific geographic area. Receivers that do not appear to show disruptions consistent with other receivers in the same geographic areas may be receiving programming from remote tuners or the television receiver may be located in a geographic location other than where the user has indicated the television receiver as being installed. Such receivers may be disabled, flagged or identified for further investigation.

A predictable or scheduled disruption may be used to identify television receivers associated with account packing. A disruption such as a solar conjunction, for example, may be highly likely to disrupt programming in a predictable manner. Disruptions may be predictable according to specific geographic locations. For instance, for a particular geographic region, such as a city, a solar conjunction can be expected to occur at approximately the same time. Disruptions due to solar conjunctions may predictably occur at different times in different geographic locations. A solar conjunction, for example, can result in rolling disruptions that progress from east to west. A disruption due to a solar conjunction may begin at a predictable time on the East coast. The disruption may then progress from East to West across the United States at a predictable rate. Television receivers located in different geographic locations may experience disruptions at different times. A television receiver located on the East coast may experience a disruption at a different time than a television receiver located on the West coast. The disruptions for each geographic location may be predictable and may be determined or calculated based on the geographic location of the receiver. A television receiver may have a stored table or a method of determining disruption timing based on the physical location of the television receiver.

A television receiver associated with account packing may receive programming from a different location than the physical location of the television receiver. A television receiver may monitor programming disruptions and compare the timing, duration, and/or type of disruption observed to the expected timing, duration, and/or type of expected disruption based on the geographic location of the television receiver. If the expected and observed characteristics of the disruptions do not match, the television receiver may be associated with account packing. If the expected and observed characteristics of the disruptions do not match, the television receiver may be configured to at least partially disable itself (e.g., disable the output of live and recorded television programming). The television receiver may prompt users to contact the service provider via a message that is output for presentation.

In some television receivers, the characteristics of one or more types of disruptions used to detect account packing may be preprogrammed or stored on the television receiver. Characteristics of the disruption may include duration, timing, type, and/or the like. A table or a method of calculation may be included based on the location of the television receiver. In some embodiments the physical location may be determined from a GPS signal, internet connection port, and the like. The location may be used to compute or determine the expected characteristics of the disruption. For instance, if a solar conjunction event does not occur at a time expected for a geographic location at which the user indicates the television receiver is installed, it may be determined that the television receiver has been installed at another location (e.g., an account packing situation).

In some television receivers, the characteristics of the disruptions used to detect account packing may be determined in a training phase. After a television receiver is deployed into a customer's home, the television receiver may monitor disruptions and record the characteristics of the disruptions related to solar conjunction. The television receiver may recognize that the disruption may be due to a solar conjunction due to its east to west disruption of satellites, timing of the disruption, and the like. The exact timing of the disruptions, the duration, and other features, which may be unique to the geographic location of the receiver, may be monitored and recorded. The features may be associated with the physical location of the receiver that may be determined by a GPS of the receiver, internet connection, manually identified, and the like. Based on the training phase, future disruption characteristics specific to the geographical location of the receiver may be determined from the characteristics captured during the training phase. In the case of a solar conjunction, for example, once a solar conjunction is observed, the timing of a subsequent solar conjunction may be calculated. When subsequent disruptions do not match the expected characteristics of the disruptions, the television receiver may be identified as a possibly associated with account packing.

Programming stream disruption monitoring, diagnosis, and notification may be implemented in a satellite based television system, an embodiment of which is illustrated in FIG. 1. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from television service provider system 110 via satellites 130. The system may include a disruption analysis engine 300 and/or a programming disruption analysis engine 211. The disruption analysis engine 300 may monitor and analyze weather patterns, network disruptions, and other events. The disruption analysis engine 300 may generate signal signatures that may be used by the programming disruption analysis engine 211 to diagnose disruptions on the receiver.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots. Information about the precise locations of satellites 130 may be provided to television receivers in the form of ephemeris information that is determined by the television service provider. Such information can be used for determining when a satellite will be approximately in line with satellite dish and the sun, which is when a solar conjunction occurs. By having information indicative of a precise location of the satellite, when a solar conjunction should occur for a particular geographic region or location may be determined with a higher degree of accuracy.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. In embodiments a stream of a television channel may be referred to as a programming stream. In some cases several television channels may be combined into one stream such as in a transponder stream. In this descriptions transponder streams and programming streams may be used synonymously.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
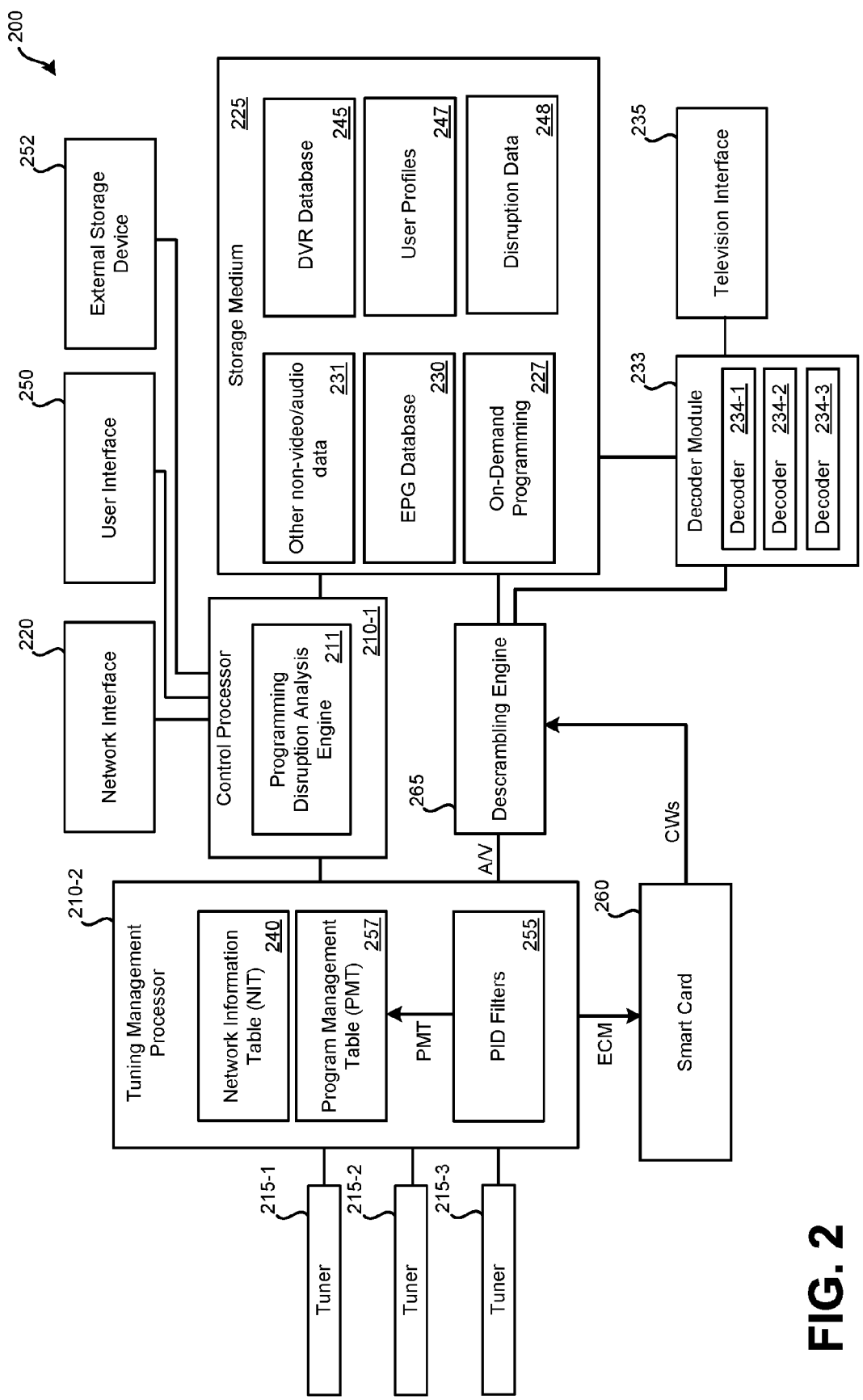
FIG. 2 illustrates an embodiment of a television receiver configured to generate user alerts for programming disruptions.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160 (rather than first storing the television channel to a storage medium as part of DVR functionality then later outputting the television channel from the storage medium), the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

By way of example, a solar conjunction may occur when the sun is approximately (or within a number of degrees) of a line drawn between a satellite from which a satellite dish is receiving a signal and the satellite dish. For instance, referring to FIG. 1, line 199 represents a path in which sun 198 is approximately in line with satellite 130-2 and satellite dish 140. When sun 198 is in such a position, programming disruption may occur at television receiver 150.

Network 190 may serve as a secondary communication channel between television service provider system 110 and television receiver 150. However, in many instances, television receiver 150 may be disconnected from network 190 (for reasons such as because television receiver 150 is not configured to connect to network 190 or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 2 illustrates an embodiment of television receiver 200. Television receiver 200 may be configured to monitor and diagnose programming streams disruptions and output notifications. Television receiver 200 may be in the form of a separate device configured to be connected with a display device, such as a television. Embodiments of television receiver 200 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 200 may represent television receiver 150 of FIG. 1 and may be in the form of an STB that outputs video and/or audio to a display device, such as a television. Television receiver 200 may be incorporated as part of a television, such as display device 160 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage and/or user-defined television programming), on-demand programming 227, user profiles 247, programming preview database 248, user interface 250, external storage device 252, smartcard 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID (packet identifier) filters 255 may be handled by separate hardware from program management table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may also communicate with network interface 220 and user interface 250. Control processor 210-1 may handle incoming data from network interface 220 and user interface 250. Additionally, control processor 210-1 may be configured to output data via network interface 220.

Control processor 210-1 may include a programming disruption analysis engine 211. Embodiments of a programming disruption analysis engine 211 are described in relation to FIG. 3.

Tuners 215 may include one or more tuners used to tune to transponders that include broadcasts of one or more programming streams or television channels. In the illustrated embodiment of television receiver 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220. For instance, instructions (e.g., regarding subscription portability) from a television service provider may also be received via network interface 220, if connected with the Internet. Network interface 220 may be used to provide a confirmation to a television service provider that instructions received from the television service provider have indeed been executed.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to EPG database 230, other non-video/audio data 231, DVR database 245, user profiles 247, programming preview database 248, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers (which may be used to ensure different satellites are tuned to for reception of timing signals), frequency identifiers and/or transponder identifiers for various television channels. In some embodiments, NIT 240 may contain additional data or additional tables may be stored by the television receiver. For example, while specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 240 and/or PMT 257 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

While a large portion of storage space of storage medium 225 is devoted to storage of television programming, a portion may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 226.

User profiles 247 may include stored user preferences. For example, a user may specify a preferred category of television programming, such as: sports, news, movies, sitcoms, reality, etc. The user may also specify whether they prefer broadcast ("live") television, on-demand programming, or recorded television programming (via user or provider defined timers). In some embodiments, data for a user's profile may be defined based on measured viewing habits, such as which television channels and/or categories of television programming does the user watch. User profiles 247 may specify which television programs were recorded based on timers set by the user associated with a specific user profile. User profiles 247 may include profiles for multiple users or may include a single profile for the television receiver in general. In some embodiments, a user is permitted to select which user profile of user profiles 247 is active. For instance, a user can log on to television receiver 200.

Decoder module 233 may serve to convert encoded video and audio into a format suitable for output to a display device. For instance, Decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265 simultaneously. For instance, each of decoders 234 within decoder module 233 may be able to only decode a single television channel at a time. While decoder module 233 is illustrated as having three decoders 234 (decoder 234-1, decoder 234-2, and decoder 234-3), in other embodiments, a greater or fewer number of decoders may be present in television receiver 200. A decoder may be able to only decode a single high definition television program at a time. However, a decoder may be able to decode multiple preview clips at the same time. Therefore, if nine preview clips are being presented as tiles in a CVM simultaneously, only one or two decoders of decoders 234 may be necessary to decode the encoded preview clips.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1. In some embodiments, it may be possible to load some or all of preferences to a remote control. As such, the remote control can serve as a backup storage device for the preferences.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use decryption engine 261 of smartcard 260 to decrypt ECMs. Decryption of an ECM may only be possible if the user has authorization to access the particular television channel associated with the ECM. When an ECM is determined to correspond to a television channel being stored and/or displayed, the ECM may be provided to smartcard 260 for decryption.

When smartcard 260 receives an encrypted ECM, smartcard 260 may decrypt the ECM to obtain some number of control words. In some embodiments, from each ECM received by smartcard 260, two control words are obtained. In some embodiments, when smartcard 260 receives an ECM, it compares the ECM to the previously received ECM. If the two ECMs match, the second ECM is not decrypted because the same control words would be obtained. In other embodiments, each ECM received by smartcard 260 is decrypted; however, if a second ECM matches a first ECM, the outputted control words will match; thus, effectively, the second ECM does not affect the control words output by smartcard 260. Smartcard 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 240 or another table, such as a program association table (PAT). From the PMT data packets, PMT may be constructed by tuning management processor 210-2.

PID filters 255 may be configured to filter data packets based on PIDs. In some embodiments, PID filters 255 are created and executed by tuning management processor 210-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or smartcard 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2. Similar to a PID filter being created for a particular television channel, a PID filter may be created for timing signals for use in determining the location of the television receiver.

Descrambling engine 265 may use the control words output by smartcard 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smartcard 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to decoder module 233 for output to a television or other presentation equipment via television interface 235.

External storage device 252 may represent an external, detachable computer-readable non-transitory storage device. The storage device may be memory, a hard drive, or some other type of device for storing computer-readable data. The user may be permitted to connect and disconnect external storage device 252 to increase and decrease an amount of storage space available for storing on-demand programming, service provider-managed television programming, and/or user managed television programming.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 1400 of FIG. 14.

Figure 3:
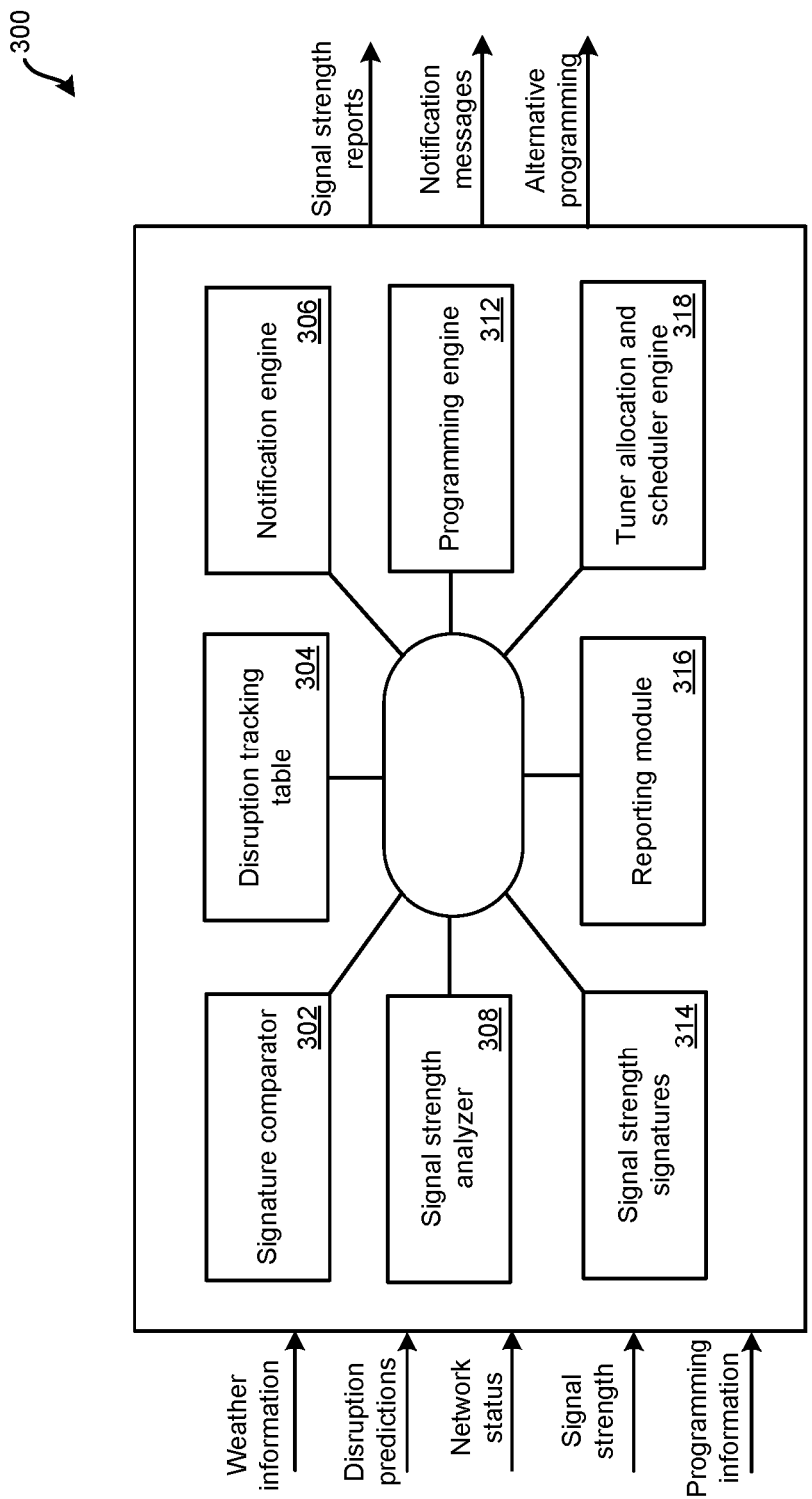
FIG. 3 illustrates an embodiment of a system for monitoring and classifying signal strength of a programming stream at a receiver.

FIG. 3 illustrates an embodiment of a disruption analysis engine 300 for determining unavailable programming streams and determining the cause of the programming disruption. The disruption analysis engine 300 may be part of the programming disruption analysis engine 211 of the television receiver 200 of FIG. 2. While the programming disruption analysis engine 211 is illustrated as being executed by control processor 210-1, it should be understood that the functionality of disruption analysis engine 300 may be distributed among various components of television receiver 200. Disruption analysis engine 300 may include: a signal strength analyzer 308, signature comparator 302, a collection or a database of signal strength signatures 314, a disruption tracking table 304, a reporting module 316, a notification engine 306, a programming engine 312, and a tuner allocation and scheduler engine 318.

The tuner allocation and scheduler engine 318 may be configured to allocate or request allocation of tuner resources. The tuner allocation and scheduler engine 318 may identify tuners that are not used by a user for viewing or recording of programming. Available tuners may be allocated to monitor the signal strength of data and programming streams. Tuners may be allocated to a programming stream and monitor the signal strength. In embodiments all available tuners, tuners that are not used by a user, may be allocated for monitoring of signal strength. In embodiments, a receiver may have fewer tuners than there are programming streams so not all streams can be monitored simultaneously. In embodiments, available tuners may be tuned to different programming streams to monitor or check the signal strength of all the available streams. In embodiments, the programming streams may be sequentially monitored by the available tuners until the signal strength of every stream has been checked.

The tuner allocation and scheduler engine may allocate available tuners equally among all of the programming streams. In some embodiments, the programming streams that the user has identified to watch the most may be given preferential treatment and monitored more frequently than other programming streams. Programming streams may be prioritized or rated based on the viewing habits of the user and/or user preferences. Programming streams that are often viewed by the user may be monitored more often than programming streams that the user never or infrequently watches. Active programming or programming streams that have timers, labeled as "favorites", and/or the like may be preferentially monitored. Preferential monitoring may include allocating available tuners for signal strength monitoring to the prioritized streams first. In some embodiments, the signal strength of prioritized programming streams may be monitored at least every minute, or every 10 seconds or less. The tuner allocation for signal strength monitoring may depend on the active profile of the user, the time of the day, day of the week, current channel being watched and/or the like. For example, when a user is watching a programming stream identified as of a specific genre (e.g. kids, science, cooking, etc.) it may be likely that a change in programming selection may be to another programming stream of the same genre. The television receiver may identify programming streams having content of the same genre and allocate tuners for preferential signal strength monitoring of these programming streams.

Available tuners may be allocated to perform signal strength monitoring in the background using available resources not used or allocated by a user for other purposes such that the user may not even be aware that the monitoring is being performed.

In some embodiments the tuner allocation and scheduler engine may use adaptive allocation techniques. The tuner allocation and scheduler engine may, for example, allocate tuners to monitor programming streams more frequently when the signal strength of the stream is below a specific threshold or has been identified to be decreasing. In one instance, the tuner allocation and scheduler engine 318 may first allocate available tuners to monitor the signal strength of all the programming streams. The initial monitoring may be used to determine a baseline signal strength reading. After several iterations of checking the signal strength of all programming streams more available tuners may be allocated to monitoring programming streams that have shown a decrease in signal strength from the initial baseline readings.

The tuner allocation and scheduler engine may also allocate available tuners for receiving data from the service provider related to the possible stream disruption. A tuner may be allocated to periodically receive data related to possible or planned disruptions. The tuner allocation and scheduler engine may adaptively allocate tuner resources to monitoring programming streams based on the received data.

For example, the television receiver may receive data related to possible signal obstruction due to weather conditions. The signal obstruction may be determined to affect a specific satellite signal or set of programming streams. The tuner allocation and scheduler engine may allocate more available tuner resource for monitoring the signal strength of the programming streams that may be affected by the weather conditions. In some embodiments, the programming streams may be monitored twice or three times more often than other programming streams.

The signal characteristics from the tuners may be received and analyzed by the signal strength analyzer 308. The signal characteristics may include signal strength, bit error rates, attenuation, signal noise metrics, and/or the like. The signal strength analyzer may monitor the signal strength for each programming stream. In embodiments the signal strength analyzer 308 may perform comparisons or other operations on each signal strength data received. The signal strength analyzer 308 may compare the signal strength to set thresholds or baselines for example. If the signal strength of the stream is below a threshold or baseline, the signal strength analyzer 308 may signal other components (e.g. the notification engine) to take further action.

In embodiments, the signal strength analyzer 308 may record and save the signal strength data for each programming stream. The signal strength data may be accumulated and analyzed to determine signal trends or signal signatures. In embodiments the signal strength analyzer 308 may analyze accumulated signal strength data to determine a signal signature. A signal signature may be numerical representations capturing changes in the signal strength. The changes in signal strength may be used by the signal strength analyzer to determine or help to determine the cause of a signal strength fade.

For example, the characteristics of the signal strength changes, the rate of signal strength decrease, and the like may be indicative of the cause of the signal obstruction. A fast and abrupt signal strength decrease may, for example, be indicative or a specific type of transponder failure. A slower more gradual signal strength decrease may, in another example, be indicative of a weather condition such as cloud cover that may slowly cause an obstruction of the satellite signal. The characteristics of the signal changes may be analyzed and compared to a dataset of known signatures. In embodiments the signal strength analyzer 308 may generate a signature for each programming stream. In some embodiments a signature may be generated for a set of programming streams.

In embodiments, a dataset of known or baseline signal strength signatures 314 may be stored in the system. The dataset may include signatures for common or representative set of signal disruptions. The dataset may include signatures for disruptions from common weather patterns or hardware failures.

A signature comparator 302 may be used to match a signature for a programming stream generated by the signal strength analyzer 308 with that of the baseline signal strength signatures 314 stored on the system. The signature comparator 302 may use statistical analysis to determine the likelihood of a cause of a signal disruption based on the signature. The output of the signature comparator 302 may be used by other modules like the notification engine 306.

In embodiments the signature comparator 302 may use data received from a service provider for determining the likelihood of the cause of the disruption of the signal. Incoming data from the service provider may indicate an incoming weather system that may disrupt the signal. In light of this data, the signature comparator 302 may weigh or give preferential treatment or weighing of baseline signatures corresponding to weather events.

The service provider may, in some cases, transmit signal strength signatures to the receiver that are related to a predicted or expected signal disruption. The signatures may correspond to a specific weather condition that is affecting the geographical area of the receiver. The signal strength signatures, weather information, signal degradation predictions, and/or the like may be transmitted to the receiver via the satellite signal and/or broadband/internet connection or communication channel.

The weather information, signatures, and other disruption related data transmitted from the service provider to the receiver may include data for a wide geographical area that is covered by the satellite signal. Many of the data pertaining to weather information may be only relevant to receivers in specific geographic locations where the weather event is occurring. In embodiments the data received by the receiver from the satellite may include tags or geographic information for which the data is relevant. The receiver may be configured to ignore disruption related data that are outside of its geographic location. A receiver may be configured by a user or from GPS or satellite data to determine its geographic location. Signatures, weather data, and other programming disruption data that pertain only to the geographic location of the receiver may be accepted or processed.

In some cases, signal strength signatures may be used directly to identify the cause of a disruption with a high degree of confidence. An observed signal strength signature may have unique characteristics allowing the television receiver to correlate or attribute the signal disruption to a specific cause. In some cases, the observed signal strength characteristics may be similar to one or more base signatures making it difficult to uniquely identify the cause of the disruption by analyzing only the signal signatures. In some embodiments, supplemental information may be used by the television receiver to determine a likely cause of the signal disruption. For example, slow degradation of signal strength may be consistent with signatures associated with several causes. For example, a slow degradation of signal over a month or more may be consistent with signatures or characteristics associated with foliage encroachment or debris accumulation. As trees gain foliage in the spring, for example, the satellite signal may be slowly obstructed. Likewise, loose dish connections or the dish may be connected to an object that moves over time, such as a deteriorating structure, may slowly disrupt the programming signal. Supplemental information such as foliage data, season data, and the like may be used to distinguish between the two likely causes. Data regarding foliage conditions for the geographic location of the receiver may be used to determine if foliage encroachment is a likely cause. If the disruption occurs during the time of the year and locations where foliage is minimal, such as winter in New York, for example, other causes may be analyzed or given preferential treatment.

In some embodiments a television receiver may correlate information related to the relative position and orientation of the satellites from which the programming streams are received. A television receiver may receive programming from multiple satellites via multiple feed horns. Each feed horn may be configured for reception from a particular satellite at a particular azimuth, angle, and/or elevation. In some cases the disruptions to signals may be isolated to a specific feed horn, or may be correlated to a specific direction or pattern of fade across the feed horns. For example, the signals may be disrupted that are consistent with an east-to-west or west-to-east disruption of the feed horns. The directionality of the disruptions, or isolation of the disruption to a specific feed horn may be used as to determine a cause of a disruption. For example, west-to-east disruption pattern of the feed horns may be correlated to moving clouds. Weather systems in many geographic locations follow a west-to-east path. A moving cloud system may consistently result in disruptions of feed horns in a west-to-east pattern over a large geographical area.

Based on the output of the signature comparator and/or signal strength analyzer, a disruption tracking table 304 may be maintained in the receiver. The disruption tracking table 304, may keep an active status of the programming disruptions. The tracking table may include the likely cause of the disruption as determined by the receiver and/or received from the service provider. The data may include the length of time the disruption has continued and the expected end time of the disruption. The disruption data may be maintained for each programming stream, each television channel, and/or each satellite. The disruption tracking table may include a history of programming disruptions that occurred in the past day, month, year, for example and any future predicted or expected programming disruptions. The disruption tracking table 304 may be periodically and/or continuously updated as new disruption data is received or a disruption is determined by the signature comparator 302 and/or the signal strength analyzer 308.

The disruption tracking table 304 may be used to quickly determine the status and cause of the disruption. The disruption tracking table 304 and/or the data from the table may be accessible to other elements of the receiver, such as the EPG. A programming guide may incorporate the data from the disruption tracking table 304 by including indications of the status of each channel. In some cases, the receiver may be configured to not show the disrupted programming streams on a programming guide and in some cases not enable the system to prevent a user from navigating or tuning to one of the disrupted programing streams.

When a user navigates to a disrupted channel, or when a channel a user is watching or recording experiences a disruption, the notification engine 306 may be activated to transmit a notification that may be displayed to the user regarding the status and cause of the disruption. The notification engine 306 may be configured to access the data from the disruption tracking table 304 and generate a friendly and/or informative message to display to the user that may include the status of the disruptions, the cause of the disruption, expected time remaining, length of time the disruption has been active, and/or the like. The message may be formatted such that it may be displayed as a pop-up or a banner on the screen of a television for example. For example, when a user attempts to tune to a channel whose signal has been disrupted by a weather condition the notification engine 306 may generate a message such as "Sorry, this channel is currently unavailable due to heavy rain in your area. Don't worry the rain is expected to pass shortly and your channel will be available in 5 minutes." The message may be displayed on the user's screen as a banner on the bottom or in the center of the screen.

The notification engine 306 may be activated when a user schedules a reminder or a recording of a channel or a program that may be expected to be disrupted. A scheduled maintenance event, for example, that may disrupt some programming may be scheduled for the time the user may have a recording set. The notification engine 306 may be configured to access data from the disruption tracking table 304 and generate a message or an indication that may be displayed to a user regarding the possible disruption including its causes and characteristics.

In some embodiments, when a user navigates to a disrupted channel, or when a channel a user is watching or recording experiences a disruption, the programming engine 312 may generate or indicate to the system to generate a list of alternative available programming. The programming engine 312 may be configured to access data from the disruption tracking table 304 to determine available channels and programming. From the available programming list the programming engine 312 may generate a list of similar programming currently available. The suggestions may be generated based on user viewing preferences, user profile, viewing habits, and/or the like.

In some embodiments, the programming engine 312 may be configured to automatically find alternative sources of the channel or programming the user was trying to watch or record. For some programming an alternative source may be simultaneously available on a different satellite, through the internet, on the DVR, or the like. For example, when a movie a user is watching is disrupted, the programming engine 312 may automatically locate another available source for the movie and tune the tuner or receiver to the source. If the movie the user was watching was in high definition, for example, and was disrupted, another channel that may be regular definition may have the same movie simultaneously available. The programming engine 312 may generate a notification and/or automatically tune to the other sources of programming.

In embodiments the system may include a reporting module 316 configured to report the status, signal strength, signal signatures, and other data to the service provider. The data may be communicated through an satellite uplink connection and/or via an internet or broadband connection or communication channel. The reporting module may transmit or upload data to the service provider when disruptions or weak signal strengths are discovered. The service provider may use the data from users to diagnose network problems, predict disruptions, and other tasks.

During a disruption of programming the user was recording or watching the receiver may monitor the signal strength to determine if the disruption has ended. In embodiments the system may continuously or periodically check the signal strength of the disrupted programming. In some embodiments the receiver may automatically try to tune back to the disrupted programming after a predetermined time or the expected time when the disruption is expected to have ended.

In embodiments, when the disruption to programming has ended, or had been detected to have ended, the television receiver may notify the user. In embodiments, when a user has navigated away from the disrupted programming stream, the system may automatically tune back to the programming stream that experienced the disruption. In some embodiments, the user may be notified with a popup window or banner asking if the user would like to tune back to the previously disrupted programming stream. In other embodiments, the user may be prompted with only a notification that the programming disruption has ended. The types of notifications received by the user when the programming disruption has ended may be set by a user profile or user preferences.

Figure 4:
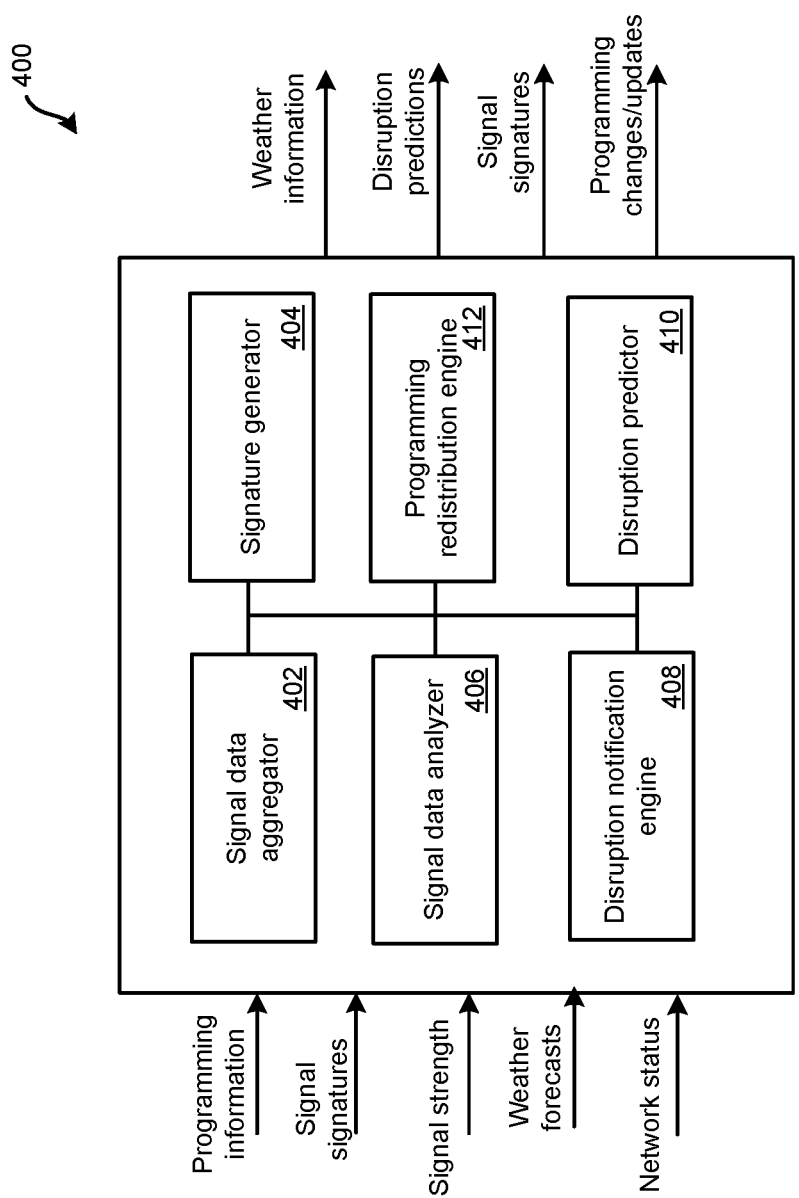
FIG. 4 illustrates an embodiment of a system for monitoring and analyzing reports of programming disruptions at the service provider.

FIG. 4 illustrates an embodiment of a service provider analysis system 400 that may be used by the service provider system for analyzing and processing signal strength data from receivers. It should be understood that the functionality of service provider analysis system 400 may be distributed among various components of a television service provider system 110. The system may receive signal strength data from receivers as well as any signatures the receivers may have generated. The service provider analysis system 400 may also receive data related to the programming viewing habits of the user, weather forecast information, and other network status information. The service provider analysis system 400 may process the information and generate distilled or pertinent weather information. The weather information output by the service provider analysis system 400 may be limited to weather systems that may be strong enough to cause obstructions to the satellite signals. The service provider analysis system 400 may also output disruption predictions based on weather, solar, and other events. The weather data and disruption predictions may be geographically tagged or labeled to allow receivers to process data relevant to their specific geographic locations. The system may also generate and distribute new signal signatures to use as baselines for diagnosing disruptions by the receivers. Likewise, any programming changes or updates may be communicated to the receivers. The service provider analysis system 400 may output the data for transmittal via the satellites such that the data may be received by the tuners of the receivers. In some embodiments, the service provider analysis system 400 may include: a signal data aggregator 402, signal data analyzer 406, a disruption notification engine 408, a signature generator 404, a programming redistribution engine 412, and a disruption predictor 410.

The signal data aggregator 402 of the service provider analysis system 400 may be configured to receive signal data from the receivers via a satellite, broadband communication, and/or other communication channels and arrange and store the data in a database or a data structure such that the data may be easily searched, queried, and analyzed. The data of the receivers may be coupled or associated with the geographic location of the receivers. The data may include signal strength data, signal signatures, programming information and other data from the receivers.

The signal data analyzer 406 may be configured to parse the aggregated signal data. The signal data analyzer 406 may parse the data to determine trends in disruptions and correlate or associate the disruptions based on weather, solar, equipment failure, or other events. For example, the data analyzer engine may determine a sudden increase in programming reports from a specific geographic area. The signal data analyzer 406 may then parse or analyze incoming weather information to determine if there are weather events in the geographic location of the disruptions.

Based on the analysis from the signal data analyzer 406 a disruption predictor 410 may determine or calculate the future spread or relocation of a programming disruption. For example, based on the analysis from the signal data analyzer 406, a weather event that has been correlated or attributed to a set of disruptions reported by receivers may be analyzed further to determine its trajectory, strength, and the like. Based on trajectory and/or strength, the disruption predictor may determine what receivers or what geographic areas are likely to experience additional disruptions.

The signature generator 404 may, based on the analysis from the signal data analyzer 406, determine signal signatures of disruptions. Based on correlations from weather patterns and signal disruptions, specific signal disruptions signatures may be assumed to be related to the specific storm, for example.

In some embodiments, service provider analysis system 400 may also include a programming redistribution engine 412 which may be configured to monitor viewing habits and/or statistics of users. The programming redistribution engine 412 may monitor signal disruptions to determine if the disruption are affecting important or popular programming streams. The redistribution engine may allocate another satellite or unused bandwidth of a programming stream that is not affected by the disruption to transmit the popular programming. The programming redistribution engine 412 may generate notification for the receivers to indicate alternate sources of the programming in case of a disruption.

The disruption notification engine 408 may collect the predictions from the disruption predictor 410, signatures from the signature generator 404, and programming changes or updates from the programming redistribution engine 412 and package and format the data for transmission to receivers via a satellite signal.

Figure 5:
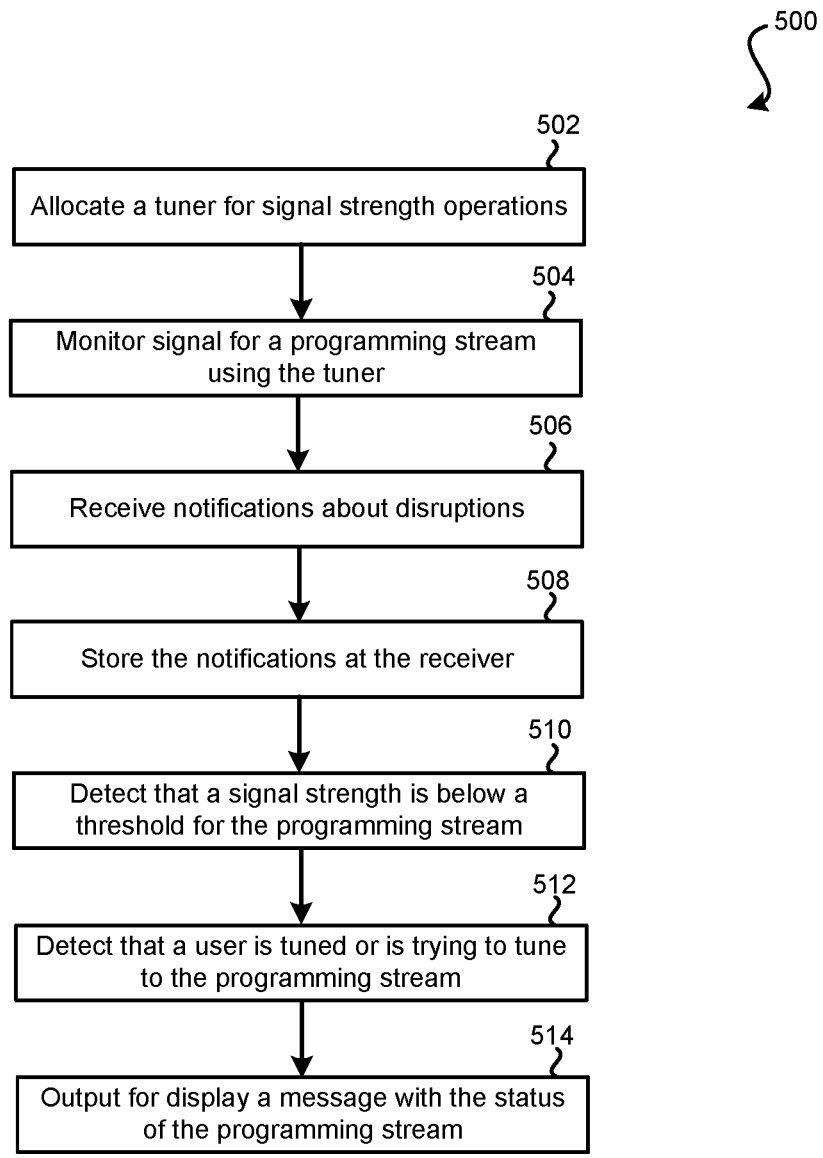
FIG. 5 illustrates an embodiment of a method for monitoring the signal strength of a programming stream.

FIG. 5 illustrates an embodiment of a method 500 for monitoring the signal strength of a programming stream. Method 500 may be performed using the systems previously described. For instance, satellite television distribution system 100, television receiver 200, and/or programming disruption analysis engine 211 of FIGS. 1-2, respectively, may be used to perform method 500. Components of such systems may be implemented using hardware, software, and/or firmware. Further, the performance of method 500 may include one or more instances of the components of computer system 1400 of FIG. 14. As such, means for performing each step of method 500 can include one or more instances of the following: one or more components of satellite television distribution system 100, one or more components of television receiver 200, one or more components of disruption analysis engine 300, and/or one or more components of computer system 1400 of FIG. 14.

At step 502, a tuner may be allocated for monitoring the characteristics of the signal of a programming stream. The tuner may be allocated based on the availability of tuners. In some receivers only an available tuner (e.g., not being used to receive television programming for output or record) may be allocated for monitoring operations. In some embodiments the signal strength of the programming streams being watched or recorded by the user may be monitored by the same tuners that are receiving the programming stream. In embodiments a different tuner may be allocated to monitor the signal strength of the programming stream being actively watched or recorded by the user.

At step 504, the tuner may be configured to continuously or periodically monitor the signal strength, noise, interference, signal quality, and the like of a programming stream. The tuner may monitor signal strength changes, trends, signatures and the like as outlined herein. In some embodiments the programming streams actively watched or recorded by the user may be given higher monitoring priority. The signal strength of actively watched or recorded programming streams may be monitored continuously or more frequently than for other programming streams. Unused tuners may be allocated to monitor the signal strength of active programming streams. In some embodiments, the receiver may prioritize the monitoring of programming streams based on user's viewing patterns, viewing histories, preferences, and the like. The signal strength of programming streams the user watches more frequently may be monitored more closely with a greater frequency, for example. Programming streams designed as "favorites" by the user may be monitored every minute, or every ten seconds or less. Programming streams that the user never watches may be monitored less frequently or never monitored. The prioritization of programming stream signal strength monitoring may change depending on the time of day, active user, active user profile, day of the week, special programming, and/or the like.

At step 506, a receiver may receive data or notifications about planned or potential programming stream disruptions. The notifications may include the cause of the disruption, the expected disruption time, and the like. A notification may, for example, include weather event information that may disrupt the programming stream. In some embodiments, the programming streams that are identified as potentially being affected by a weather event or other disruption may be designed for high monitoring prioritization and monitored more frequently.

At step 508, the notification may be stored at the receiver for later use. The notifications may be available for access by a user. The notifications may be displayed with or as part of an electronic programming guide, for example. Such a notification may be presented when a user attempts to tune to an affected television channel.

At step 510, the tuner may monitor the signal strength of the programming stream to determine if the signal is below a specific threshold value. When the signal strength of the programming stream is fading and drops below a threshold it may indicate that the programming stream will experience disruptions. The threshold may be set to a signal level slightly higher (1 or 10 or more dB) than a minimal signal strength necessary for proper programming stream reception. In some embodiments, the threshold may be set to a signal strength level that is below or right at the minimum signal strength level for proper receptions of the programming stream.

At step 512, the television receiver may detect that a user is tuned to or may be trying to tune to a programming stream that has been disrupted or with a signal strength that is below the set threshold.

At step 514 the receiver may output a message for display (or otherwise output, such as via audio) to the user regarding the signal strength of the programming stream the user is tuned to or may be trying to access. The message may include information from the notification received by the receiver and may include a cause of the disruption, expected duration, and the like. In some embodiments the message may include other programming suggestions or other sources of the programming the user was trying to access. For example, the message may include a channel number or a link to an alternative programming stream that has the same or similar programming that is not experiencing a disruption. In some embodiments the unavailable or disrupted programming may be automatically skipped or not displayed when a user is navigating searching for channels. The unavailable or disrupted channels may be identified as temporarily unavailable in the programming guide with optionally an expected time the programming stream is expected to be unavailable. In some embodiments the programming guide may include different colors, shading, or other effects to show the time for which the programming may be disrupted or unavailable.

Figure 6:
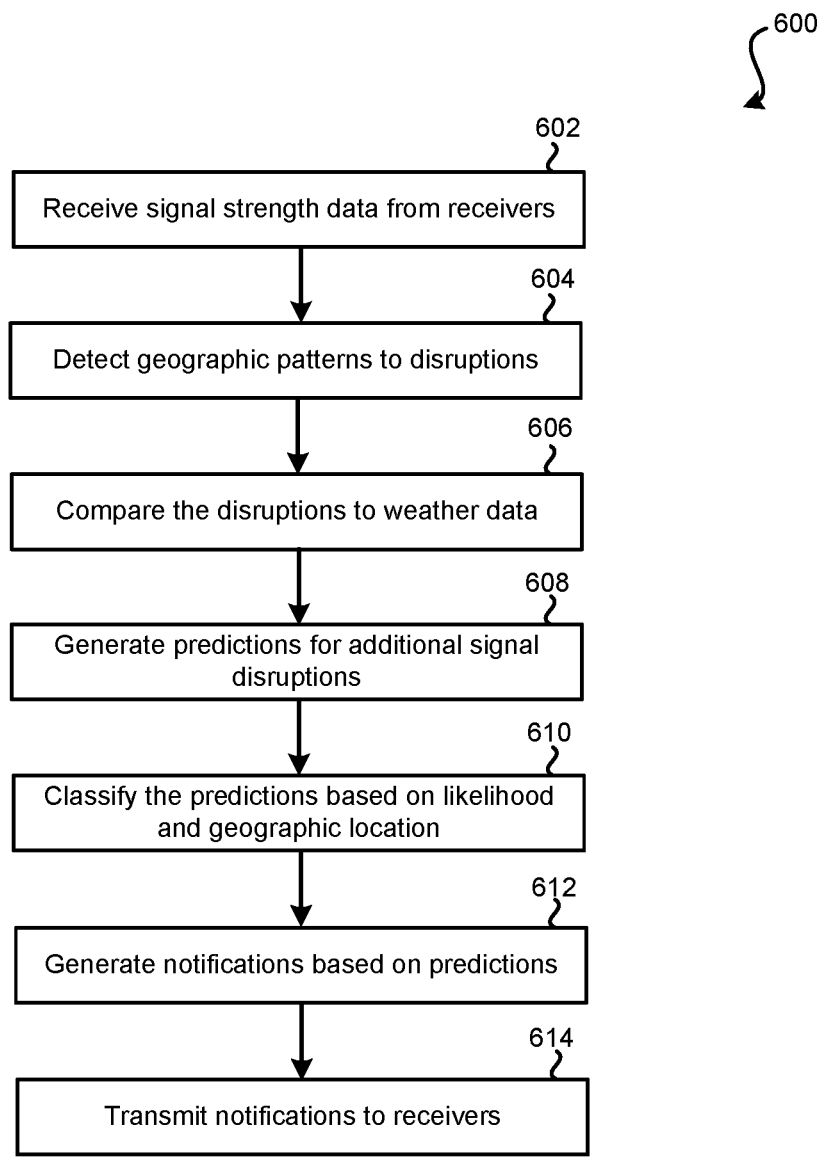
FIG. 6 illustrates an embodiment of a method for generating programming disruption notifications.

FIG. 6 illustrates an embodiment of a method for generating disruption predictions by a service provider. Method 600 may be performed using the systems previously described. For instance, satellite television distribution system 100 of FIG. 1 may be used to perform method 600. Components of such systems may be implemented using hardware, software, and/or firmware. Further, the performance of method 600 may include one or more instances of the components of computer system 1400 of FIG. 14.

At step 602, the service provider system may receive and aggregate signal strength data from receivers in the network. Such information may be sent to the service provider system via an Internet connection (e.g., network 190). The data may include changes to signal strength, disruptions, and the like. The data may include geographic information of the receiver which generated the data. In some embodiments, the geographic information may include a zip code, address, television receiver identifier, or account identifier. The service provider may use a television receiver identifier or account identifier to look up a location for the television receiver based on information gathered from a user when a user account was created or last modified.

At step 604, the received data may be analyzed to determine trends or geographic patterns to the disruptions. Clustering or other algorithms may be used to find patterns or clusters of disruptions or weak programming signals. For instance, for a particular geographic region, a weather event may cause a similar signal strength loss to occur at geographically grouped television receivers. At step 606, the geographic patterns may be analyzed and compared to data or data related to weather events, solar events, network infrastructure data, and the like.

At step 608, the system may generate predictions for possible disruptions based on the current disruptions and the weather, solar, and network data. For example, if a cluster of disruptions is identified to be related to a weather event, predictions for additional disruptions may be generated based on the trajectory and/or strength of the weather event. As an example, if a weather system is moving west to east, if an outage is occurring for television receivers in a first zip code, a prediction may be made for zip codes to the east of the first zip code.

At step 610, the predictions may be classified according to their likelihood. A prediction may be, for example, classified on a class 1-3 scale with class one being high likely (90%+ chance of occurring) and class 3 as moderately likely (less than 40% chance of occurring). At step 612 the system may generate notifications based on the predictions and at step 614 transmit the notifications to receivers.

Figure 7:
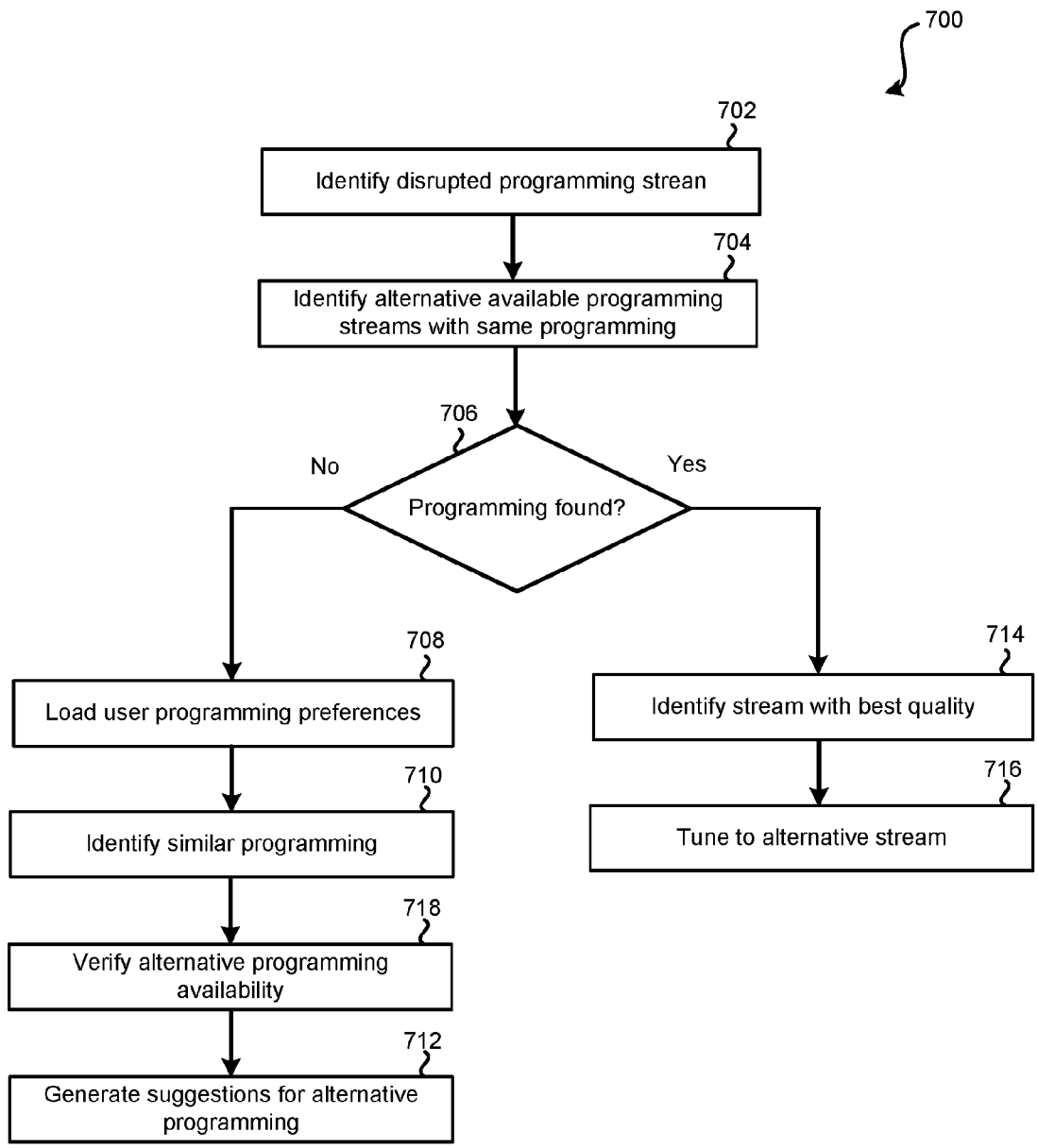
FIG. 7 illustrates an embodiment of a method for providing alternative programming during a disruption.

FIG. 7 illustrates an embodiment of a method 700 for providing alternative programming during a disruption. Method 700 may be performed using the systems previously described. For instance, satellite television distribution system 100, television receiver 200, and/or programming disruption analysis engine 211 of FIGS. 1-2, respectively, may be used to perform method 700. Components of such systems may be implemented using hardware, software, and/or firmware. Further, the performance of method 700 may include one or more instances of the components of computer system 1400 of FIG. 14.

At step 702 the system may identify the disrupted programming stream and the programming (e.g., movie, show, sporting event) the user may be trying to access. At step 704 the system may try to identify alternative sources of the programming that user is trying to access. The system may parse programming guide information or query other parts of the receiver to identify the programming. Alternative programming sources may include programming streams on different satellites, programming from the internet, broadcast programming, recorded programming, and the like. The alternative programming may be lower quality or a different release in some cases. When the alternative programming is identified, the system may at step 714, choose the programming stream with the best quality or most likely not have disruptions. At step 716, the system may automatically tune to the alternative programming stream. In some cases the system may prompt the user for input to determine if the user accepts tuning to the alternative programming stream.

If the system cannot find the same programming available in a different programming stream, the system may try to find similar programming that is not disrupted that the user may like to watch based on the user's preferences, profile, or similarities with the programming the user was trying to access. At step 708, the system may load user programming preferences and profile. At step 710, the system may access a programming guide or query other elements of the receiver to identify similar programming or programming that matches the user's profile and preferences. At step 718 the availability of the programming streams of the identified programming may be verified to avoid. Programs associated with programming streams with a weak signal or predicted disturbances may be filtered by the system. At step 712, the system may generate suggestions for alternative programming to the user.

Figure 8:
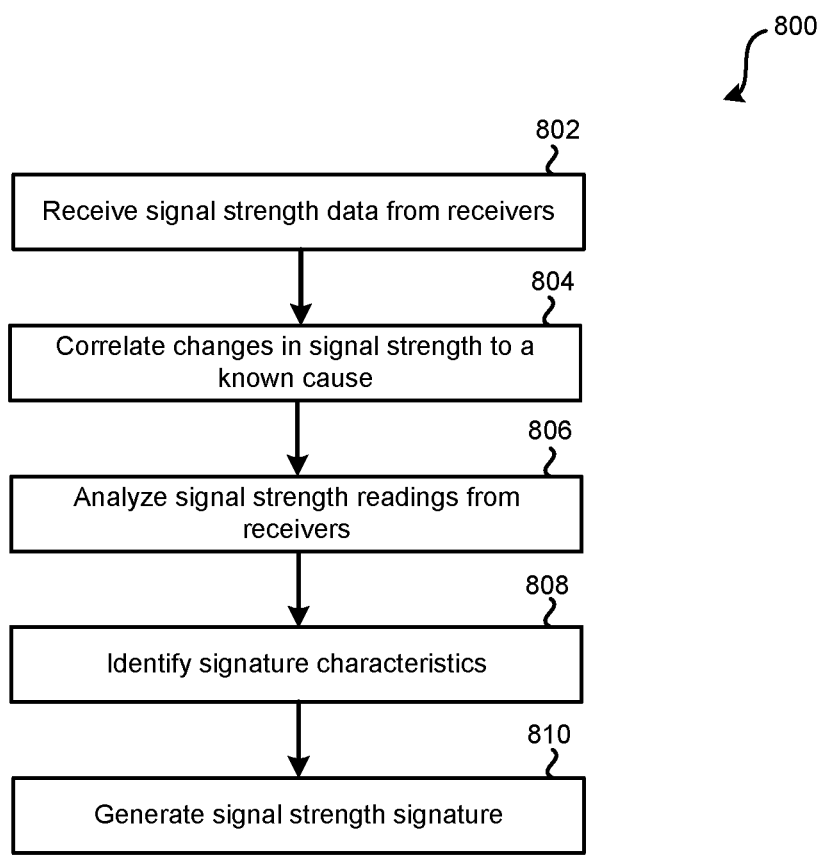
FIG. 8 illustrates an embodiment of a method for generating a signal strength signature.

FIG. 8 illustrates an embodiment of a method 800 for generating a signal strength signature. Method 800 may be performed using the systems previously described. For instance, satellite television distribution system 100, television receiver 200, and/or programming disruption analysis engine 211 and/or the disruption analysis engine 300 of FIGS. 1-2, may be used to perform method 800. Components of such systems may be implemented using hardware, software, and/or firmware. Further, the method 800 may include one or more instances of the components of computer system 1400 of FIG. 14. In embodiments, signature generation may occur at special training times in a controlled environment or test bed. In some embodiments, signature generation may be occur based on analysis of real signal readings from receivers deployed to customers. At step 802 the disruption analysis engine 300 may receive signal strength data from receivers. The data may be transmitted from a receivers to the prediction system when a receiver observes a drop in signal strength or a disruption. The signal strength data may be a stream of data points that includes a signal strength readings for multiple time instances. In some cases, the signal strength data may include other representations of changes in the signal strength such as representative curve equations that define the behavior of the signal. The signal data may be associated with time. Each data sequence may be associated with a real time using a real-time clock or other reliable time sources. The time of different receivers may be synchronized allowing correlation and comparison between different signal data.

In step 804 changes in the signal strength readings may be correlated or associated with known causes of the disruption or decrease in signal strength. In controlled environments the causes may be controlled or created by the system operators. In deployed systems the causes may be known weather events, network disruptions, and the like. In step 806 the system may analyze the signal strength readings. The signal strength may be analyzed and reformatted to determine the most suitable domain or data representation for the behavior of the signal readings. In some cases the data may be analyzed and reprocessed in the frequency domain, for example. In step 808 the system may determine characteristic features of the signal strength data at the times the disruption events are known to have occurred. The signal data may have one or more defining features such as a dip in signal strength, a sharp decrease, or a specific pattern that may be unique to the cause of the signal disruption. Signal strength readings from multiple receivers may be analyzed to determine variations in the characteristics and patterns. In step 810 a signature may be generated from one or more receiver readings and analyzed characteristics. In some embodiments, the signature may be an average of the received signal strength readings. In some embodiments, the signature may be any convenient or appropriate representation of the reading data that allows a reliable identification of the features and characteristics of the signal. Each signature may be associated with the known cause of the signal disruptions. The signatures may be used to compare to signal readings to identify a possible cause for unknown disruptions.

Figure 9A:
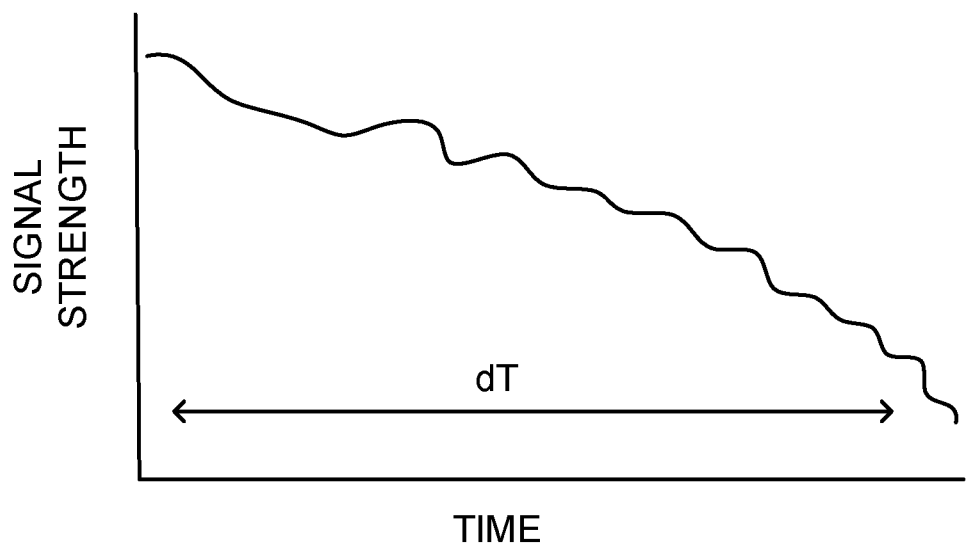
FIG. 9A and FIG. 9B illustrate embodiments of signal signatures.
Figure 9B:
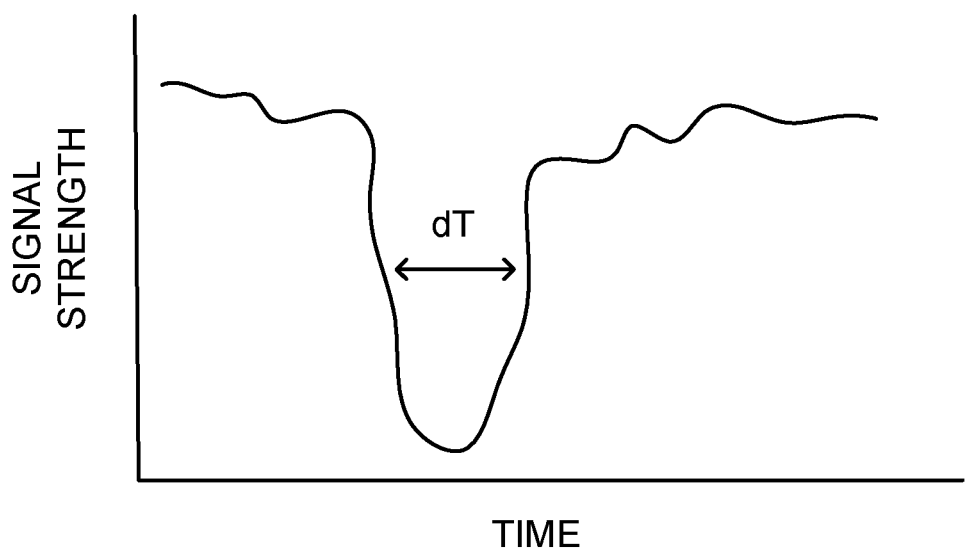

FIGS. 9A and 9B depicts example embodiments of two different signal strength signatures. The signatures may represent a specific behavior of the signal strength with respect to time as measured by a television receiver via a satellite dish antenna. The signature may have specific characteristics such as the time of the change, the magnitude of the change, and/or other characteristics. For example, the signature shown in FIG. 9A depicts a slowly fading signal over a time period dT. The time period may be over a week or even a month. Such a signature may be indicative of a disruption caused by slow foliage encroachment into the path of the satellite dish. Growing trees or blooming trees in the spring month of the year may slowly decrease the signal strength. FIG. 9B depicts a sharp and temporary dip in the signal strength. The dip may have a duration dT of a couple hours or a day. Such a signature may be indicative of a disruption caused by a fast moving weather event with heavy rain or clouds that may temporarily block the signal from the satellite. Signal strength readings may be compared to the signatures such as those depicted in FIGS. 9A and 9B. The closest matching signature may be used to determine the cause of the observed signal behavior or disruption.

Figure 10:
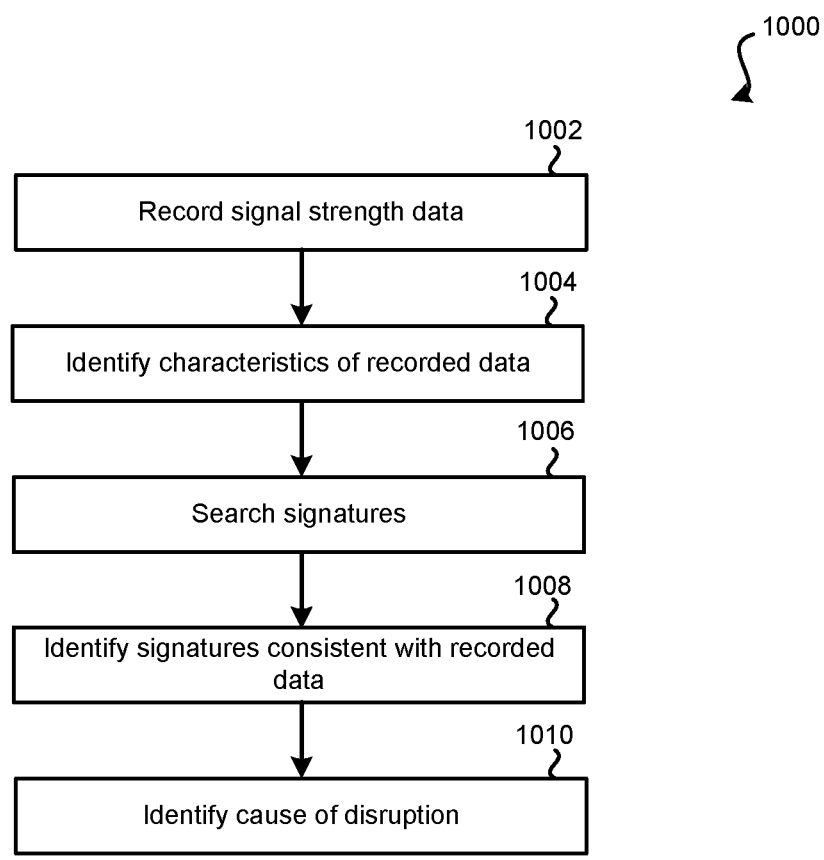
FIG. 10 illustrates an embodiment of a method for using a signal signature to diagnose a cause of a disruption.

FIG. 10 illustrates an embodiment of a method 1000 for using a signal signature to diagnose a cause of a disruption at a receiver. Method 1000 may be performed using the systems previously described. Components of such systems may be implemented using hardware, software, and/or firmware. Further, the method 1000 may include one or more instances of the components of computer system 1400 of FIG. 14. In step 1002 the receiver, using tuner, may monitor the signal strength. The signal strength readings may be recorded and written into memory. The readings may be analyzed to determine a characteristic of the readings and the disruption in the readings. The characteristics may include the time of the disruption, the frequency domain characteristics, acceleration of changes in signal readings, and/or the like. In step 1006, the identified characteristics may be used to search a repository of signal signatures to identify a subset of signatures that matches the characteristics, such a repository may be stored locally by a television receiver or may be maintained remotely by a television service provider. In step 1008 the subset of signatures that match the identified characteristics may be further analyzed. Additional analysis may be performed to determine the signature in the subset of signatures that provides the best match with the recorded data. In step 1010 the cause of the disruption may be determined to be the cause associated with the matching signature. An indication of the type of disruption may be indicated to the user, such as in the form of a displayed message or auditory message. The indication may also include a message of recommendations for correcting the issue.

Nefarious activity, such as "account packing" may be detected by using signal disruptions. "Account packing" refers to a user or group of users indicating that multiple television receivers are installed at a particular location, such as a house, as part of a group subscription (e.g., a household subscription for four television receivers to be installed within a single household). Typically, a user receives a discount for having multiple television receivers installed in a single household. "Account packers" falsify information such that the television service provider believes that a group of television receivers are installed at a single location, but in reality such television receivers are distributed at multiple locations (e.g., one at each residence of the persons participating in the account packing scheme). Typically, this form of fraud is performed to save the account packers from each having to pay full price for their respective subscriptions (that is, a group subscription for multiple television receivers intended for a single household is almost always cheaper than individual subscriptions for the same number of television receivers).

Figure 11:
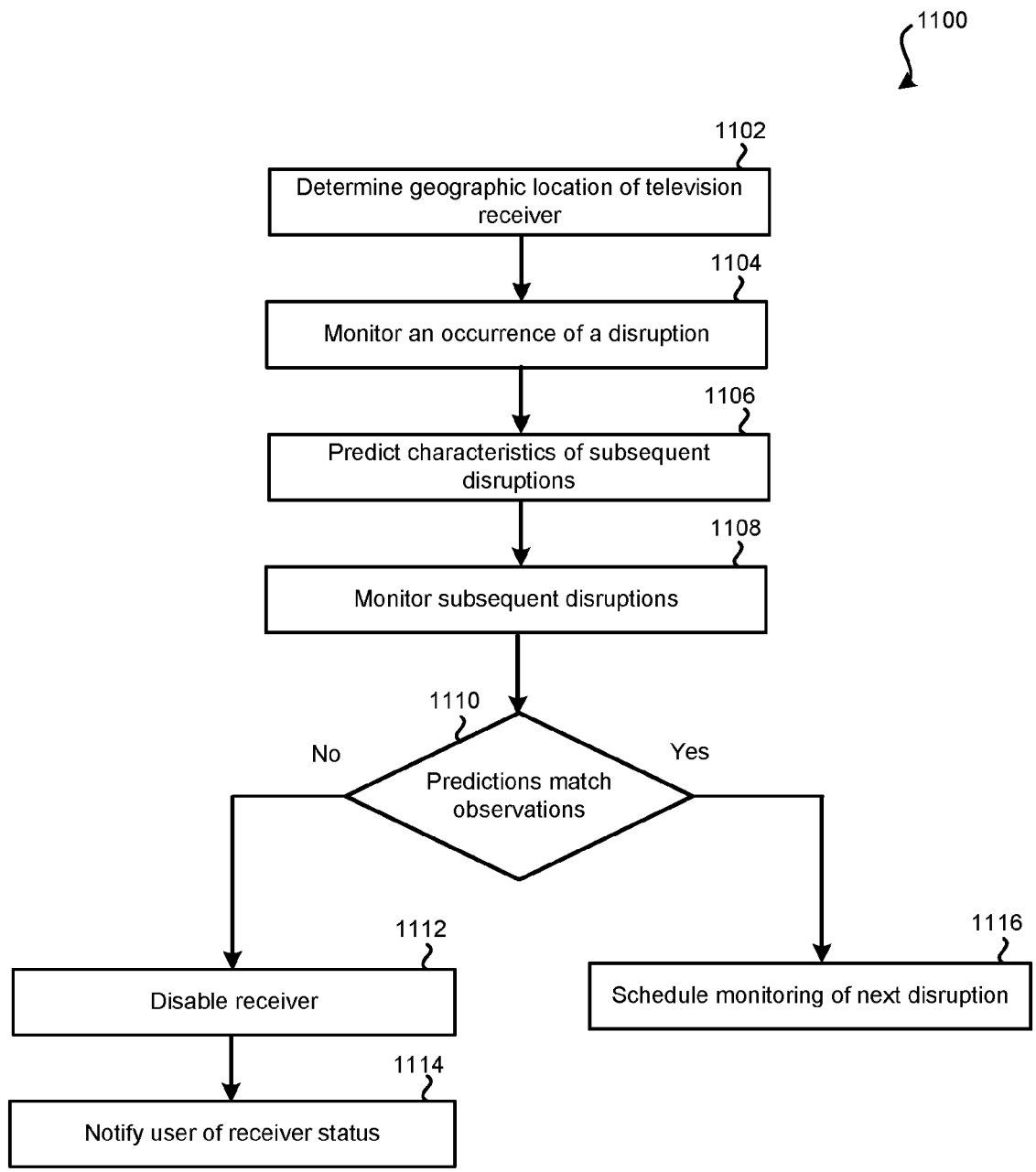
FIG. 11 illustrates an embodiment of a method for determining account packing using a predictable disruption.

FIG. 11 illustrates an embodiment of a method 1100 for determining account packing using a predictable disruption. Method 1100 may be performed using the systems previously described, such as one or more television receivers and a television service provider system, such as illustrated in FIG. 1. Components of such systems may be implemented using hardware, software, and/or firmware. Further, the method 1100 may include one or more instances of the components of computer system of FIG. 14. In step 1102 the geographic location of a television receiver where the receiver is supported to be located may be determined. The location may be manually entered by a user, determined or received from a GPS sensor, determined from identifiers or location of a network connection, or determined by the user's account information. The location may be specific identifying the exact street or building where the television receiver is deployed. In some cases the location may be general and may roughly identify a town, a city, county or longitude or latitude coordinates. For an account packer, such location information may be incorrect (e.g., intentionally falsified).

In step 1104, the television receiver may monitor an occurrence of expected/known geographically unique disruptions such as during a solar conjunction event or the like. A solar conjunction may represent a specific type of signal degradation or outage, based on the sun being approximately in line with the line-of-sight between a satellite and a satellite dish. The large amounts of RF noise output by the sun may overwhelm the satellite dish, thus greatly decreasing the signal strength from the satellite or rendering the satellite's signal undetectable. The receiver may monitor the characteristics of the disruption. The duration, timing, and types of the disruption may be monitored and recorded. The television receiver may have or receive an indication or an estimate of the timing and type of disruption the receiver may experience due to a solar conjunction. Such timing may be highly predictable because the location of the satellite and the location of the sun in the sky can be calculated for a given geographic location. If the solar conjunction event occurs on time, the television dish receiving the signal is likely located in the geographic location determined at step 1102. However, if the solar conjunction occurs at another time or does not occur, the geographic location determined at step 1102 may be false, and may be indicative of account packing.

The television service provider may provide a television receiver with an indication of when an outage or signal degradation is expected to occur based on a calculation involving the location of the satellite and the position of the sun in the sky (which is based on the earth's orbit of the sun and the earth's rotation) based on the geographic location of step 1102. The television receiver may start monitoring operation before the initial expected time of the disruption. The television receiver may monitor aspects of the disruption related to the disrupted channels or satellites, the sequence of disruptions, the magnitude of the disruptions, the magnitude of the signal degradation, and/or the like. For disruption due to solar conjunction, for example, the television receiver may monitor the sequence of disruptions of the programming streams. Programming streams associated with satellites in the east may experience disruptions before programming streams associated with satellites in the west. The relative duration of disruptions for programming streams associated with each satellite may be recorded.

In step 1106 the recorded characteristics may be analyzed and used to determine or used in prediction of characteristics of subsequent disruptions. Subsequent disruptions may have very similar predictable characteristics for a geographic location. After the characteristics are determined it may be expected that future disruptions may have very similar characteristics. If the television receiver and the receiving dish are not moved to a significantly different geographical location the characteristics of the disruption may be periodic and predictable according to the predicted characteristics. However, if the disruptions are observed from a different physical location the predicted characteristics of the disruption may be different. For instance, if a solar conjunction occurs at a particular time one day, a similar event may be expected to occur the next day at a similar time.

In step 1108, subsequent disruptions may be monitored. Based on the prediction of the characteristics the exact timing of the subsequent disruptions may be determined. The characteristics of the subsequent disruptions may be recorded and compared to the predicted or expected characteristics in step 1110. If the predictions match observations the monitoring of the next disruption may be scheduled.

If the predictions of the characteristics (based on a monitored occurrences of step 1104 and/or information receiver from a television service provider) do not match the observations, the receiver may be receiving programming streams at a physical location that may be different from the location of the receiver and the receiver may be a participant in account packing. As well other conditions may also factor into different observed outages and signal disruptions between different geographic locations. For example, if the disruption occurs earlier than expected or predicted, such as 20 seconds or more, the television receiver may be located in a geographic location other than the location determined at step 1102. The television receiver may disable itself or limit its functionality in step 1112. The television receiver may be configured to provide to the user an indication, such as a banner on the user's television instructing the user to contact customer support so that the discrepancy between the predicted and observed characteristics of the disruption may be investigated or resolved in step 1114.

Figure 12:
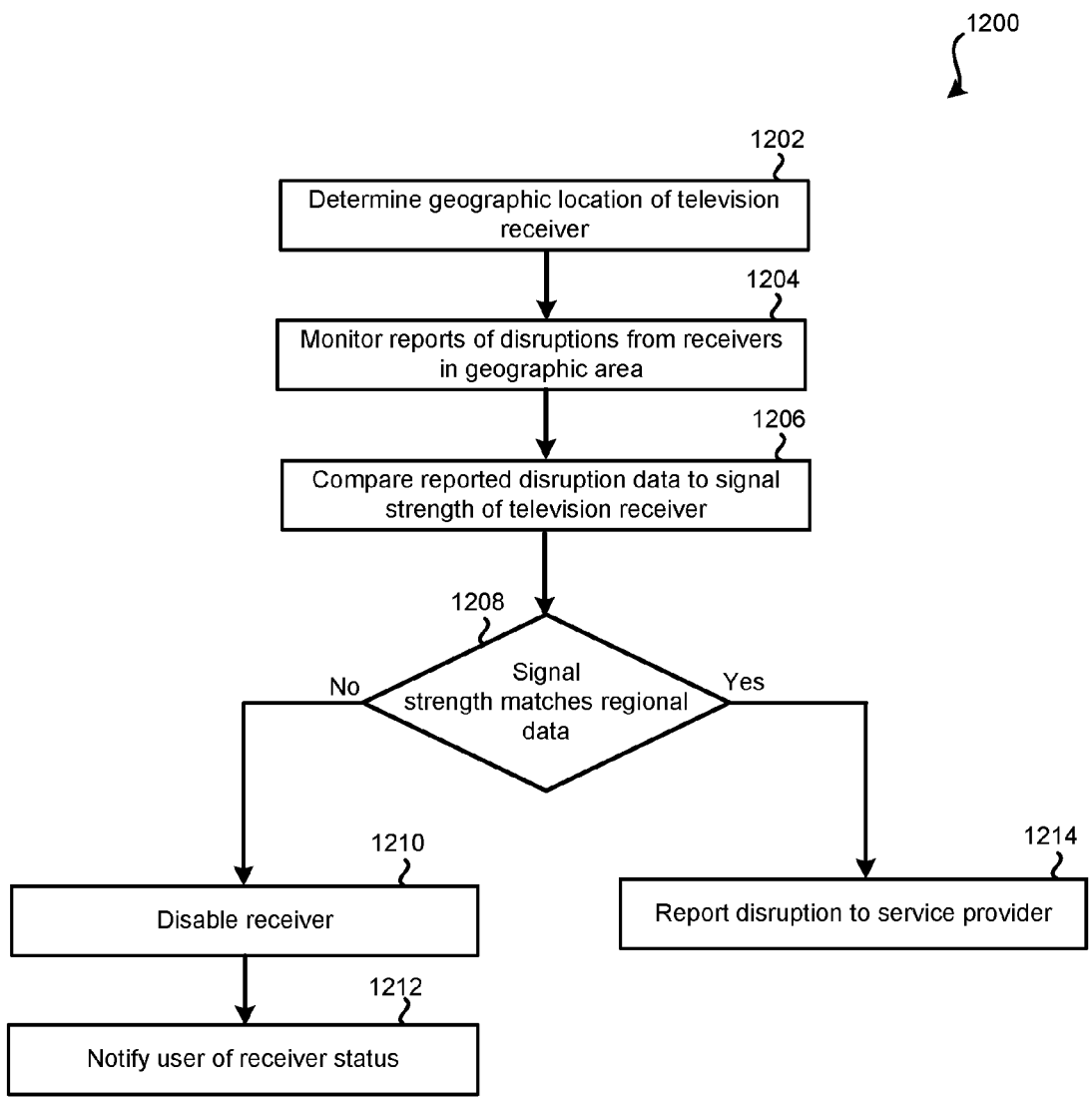
FIG. 12 illustrates an embodiment of a method for determining account packing using regional disruption data.

FIG. 12 illustrates an embodiment of a method 1200 for determining account packing using regional disruption data. Method 1200 may be performed using the systems previously described. Components of such systems may be implemented using hardware, software, and/or firmware. Further, the method 1200 may include one or more instances of the components of computer system of FIG. 14. In step 1202 the geographic location of a television receiver may be determined. The location may be manually entered by a user, determined or received from a GPS sensor, determined from identifiers or location of a network connection, or determined by the user's account information. For account packers, the location determined at step 1202 may be false due to the user falsifying information about where the television receiver and satellite dish is installed. In step 1204, the signal strength of other television receivers in the same geographic area may be monitored. The signal strength readings of television receivers in a same geographic area may be compared to one another to identify anomalies or receivers that have different signal strength characteristics than the majority of receivers in the same geographic area. Weather events or solar events may be expected to affect the signal strength of television receivers in a geographical area in a consistent manner. During a storm, for example, most or even all television receivers in a particular town or zip code may be expected to experience signal degradation. When the majority of receivers in a geographic area are reporting signal disruptions, particular receivers that are supposedly located in the same geographic location (based on step 1202) but not reporting disruptions may be flagged as television receivers that may be associated with account packing (or are otherwise located in a geographic region other than the one determined or indicated at step 1202). The signal strength data, location, and other signal characteristics may be compared with the signal strength readings of television receivers in the same geographic location in step 1206. If a receiver's signal characteristics do not match the characteristics of other receivers that are supposedly in the same geographic region, the receiver may be disabled in step 1210 and the user may be notified of the receiver status in step 1212. If the data from the receiver match the regional data the signal strength of the receiver may be configured to report its data to the service provider in step 1214.

Figure 13:
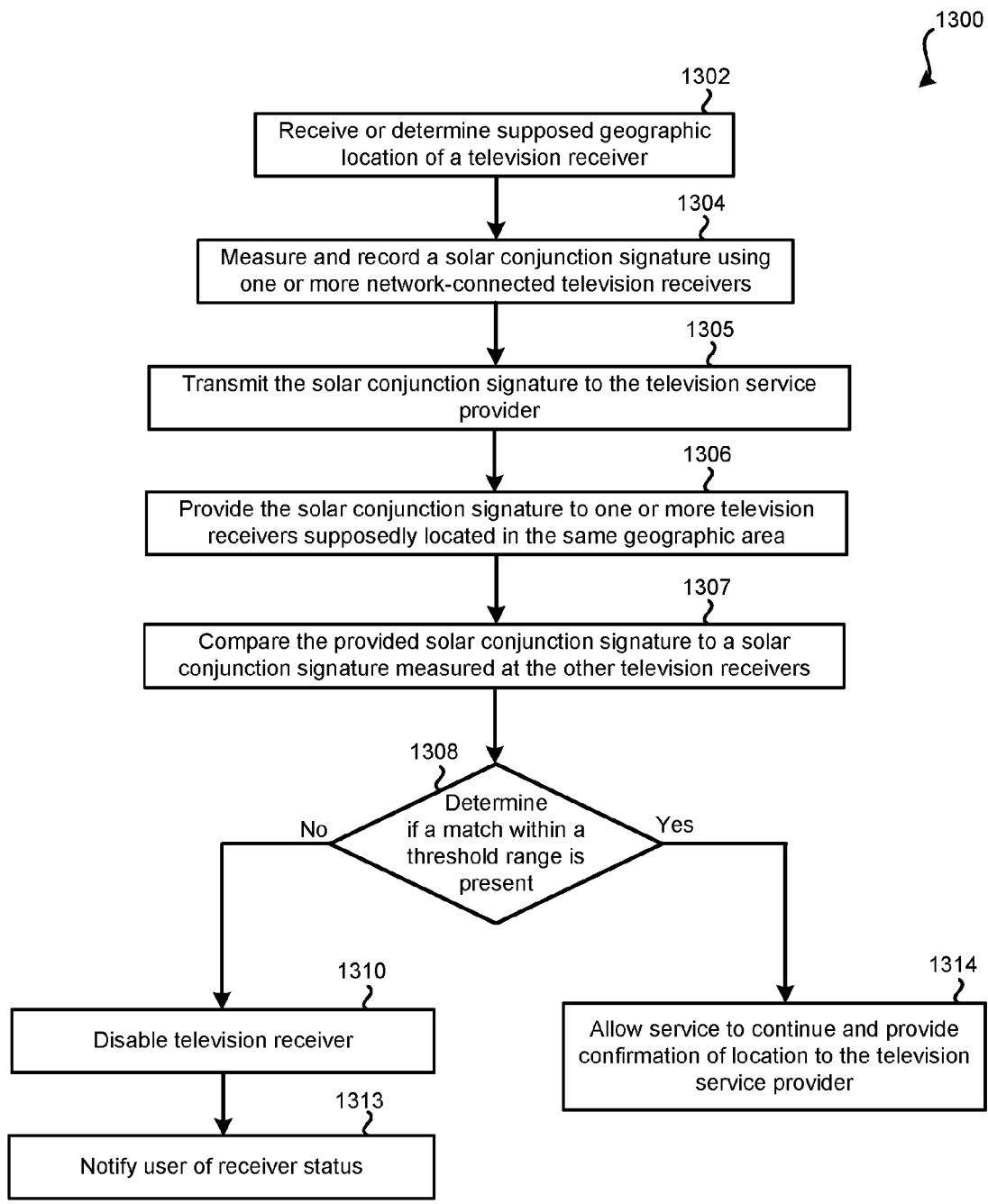
FIG. 13 illustrates an embodiment of a method for determining account packing using regional disruption data matching.

FIG. 13 illustrates an embodiment of a method 1300 for determining account packing using regional disruption data matching. Method 1300 may be performed using the systems previously described. Specifically, steps of method 1300 may be performed by a television receiver, such as television receiver 150 of FIG. 1. The embodiment detailed below is focused on a solar conjunction, however it should be understood that such embodiments may be adapted for other forms of events that affect signal strength over a geographic region, such as a weather event.

At step 1302, the geographic location of a television receiver may be determined. The location may be manually entered by a user, determined or received from a GPS sensor, determined from identifiers or location of a network connection, or determined by the user's account information. For instance, when a user first signs up for an account, the user may be requested to provide an address at which the television receiver will be installed. An account packer may provide a false address or other form of location—that is, an address that does not match the address at which the television receiver will be installed. Therefore, following step 1302, it may be unknown whether the received address for the television receiver is accurate.

At step 1304, a solar conjunction signature may be measured and recorded by one or more network-connected television receivers in a geographic region. These television receivers may be known or expected to be in the particular geographic region. At the same time, television receivers that have their geographic location in question (but are supposedly located in the same geographic region as the television receivers with the known location), such as the television receiver of step 1302, may measure and record a solar conjunction signature indicative of signal strength, timing, duration, and/or other characteristics. The timing, duration, specific measurements of the disruption, may be measured by the network-connected television receivers that are determined as highly likely as being located in a particular geographic region. Such television receivers may be determined as highly likely being located in a particular geographic region based on the television service provider performing the installation of such television receivers, previous solar conjunction measurements at the locations strongly correlating with other solar conjunction measurements for the geographic area in time and/or signature, and/or by virtue of the television receiver being network connected (account packers tend to keep illicit television receivers disconnected from the Internet in an attempt to hide their location). At step 1304, the television service provider may provide an indication to television receivers (including the network connected television receivers and the television receivers for which the geographic area is in question) in a particular geographic region to measure and record characteristics of the solar conjunction. Since the location of the sun in relation to the geographic region and the satellite can be calculated with a high degree of accuracy, the television service provider may be aware of a time period during which the solar conjunction will occur for the geographic region. Instructions to measure and record the solar conjunction during the time period may be transmitted to the network-connected television receivers and the television receivers having the questionable geographic region (e.g., the television receiver of step 1302) via the Internet or via the television service-provider network (e.g., via satellite). If transmitted via satellite, television receivers that are not network connected within the geographic area may also be instructed to measure and record the solar conjunction signature, even if such television receivers cannot transmit signature data back to the television service provider.

The solar conjunction signatures measured by the network-connected television receivers at step 1304 may be transmitted to the television service provider via the network connection at step 1305. Use of the network may be necessary since the satellite-based television distribution system transmits data in a unidirectional manner to the television receiver. Once the signatures have been received, the television service provider's system, such as television service provider system 110 of FIG. 1, may create a common conjunction profile based off of at least some of the received signatures from the network-connected television receivers that are known to be located within the geographic area. Therefore, the common conjunction profile can be representative of multiple of the received solar conjunction signatures.

The television service provider system may then at step 1306 provide this common conjunction profile signature to multiple television receivers via the network and/or the television service provider system. Distribution of the common conjunction profile via the television service provider system may be preferable since it may be transmitted to television receivers that are not network connected. The common conjunction profile may be provider to television receivers indicated as being in the same or a similar geographic area as the network-connected television receivers that performed step 1304. For example, the television receiver of step 1302 supposedly located in the geographic region may receive the common conjunction profile at step 1306. In some embodiments, the solar conjunction event can be modeled and calculated (e.g., a time of occurrence) by the service provider rather than relying on data to be provided by television receivers located in the geographic region.

At step 1307, the television receiver of step 1302 for which the geographic region has not been confirmed (possibly along with other television receivers in the same geographic region) may perform a comparison between the received common conjunction profile and the television receiver's own measured and recorded solar conjunction signature performed at step 1304. In some embodiments, the profile provided to the television receiver may include a duration, an expected amount of signal loss, and timing. In other embodiments, the profile may only indicate timing (that is, a time at which the solar conjunction is expected to occur). At step 1308, the television receiver may make a determination whether the received common conjunction profile matches its own measured and recorded solar conjunction signature within a threshold range. The match may be based on time (e.g., solar conjunction events occurring at the same time) and/or signal strength (e.g., a similar drop in signal strength from the satellite during a defined time period). Alternatively or additionally, a duration may be used as part of the determination. If step 1308 is evaluated as yes, method 1300 may proceed to step 1314 at which television service is allowed to continue by maintain enablement of one or more features of the television receiver. If the television receiver has a means of communicating with the television service provider, such as a network connection or dial-up service, the television receiver may notify the television service provider that the common conjunction profile matches the television receiver's own measured solar conjunction signature, thus indicating that the television receiver is at least in the general geographic region determined or received at step 1302. At step 1314, the television receiver may exempted from performing future solar conjunction comparisons either permanently, until the power to the television receiver has been interrupted, or for a defined period of time, such as six months.

Returning to step 1308, if a match between the common conjunction profile and the television receiver's measurement of the conjunction do not match within a threshold, method 1300 may proceed to step 1310. At step 1310, one or more functions of the television receiver may be disabled. For instance, the television receiver may disable itself such that it does not output television programming, live and/or recorded, for presentation. Additionally or alternatively, the television receiver, if it has a network connection, may attempt to contact the television service provider to notify the service provider of the television receiver being disabled and/or the suspected account packing situation. At step 1313, a user of the television receiver may be notified that the television receiver has been disabled. Such as by the television receiver causing a message to be displayed, such as: "Your television receiver has been disabled. Please contact your television service provider at 1-800-555-5555 for more information. Error code: SC001232". Such an error code may be generated by the television receiver or retrieved from storage and displayed to identify to the television service provider why the television receiver was disabled. Once disabled, the television receiver may remain disabled until re-enabled by the television service provider, either via data transmitted to the television receiver via the television distribution network or a network connection. In some embodiments, a user may be given a code or other instructions for re-enabling the television receiver.

Figure 14:
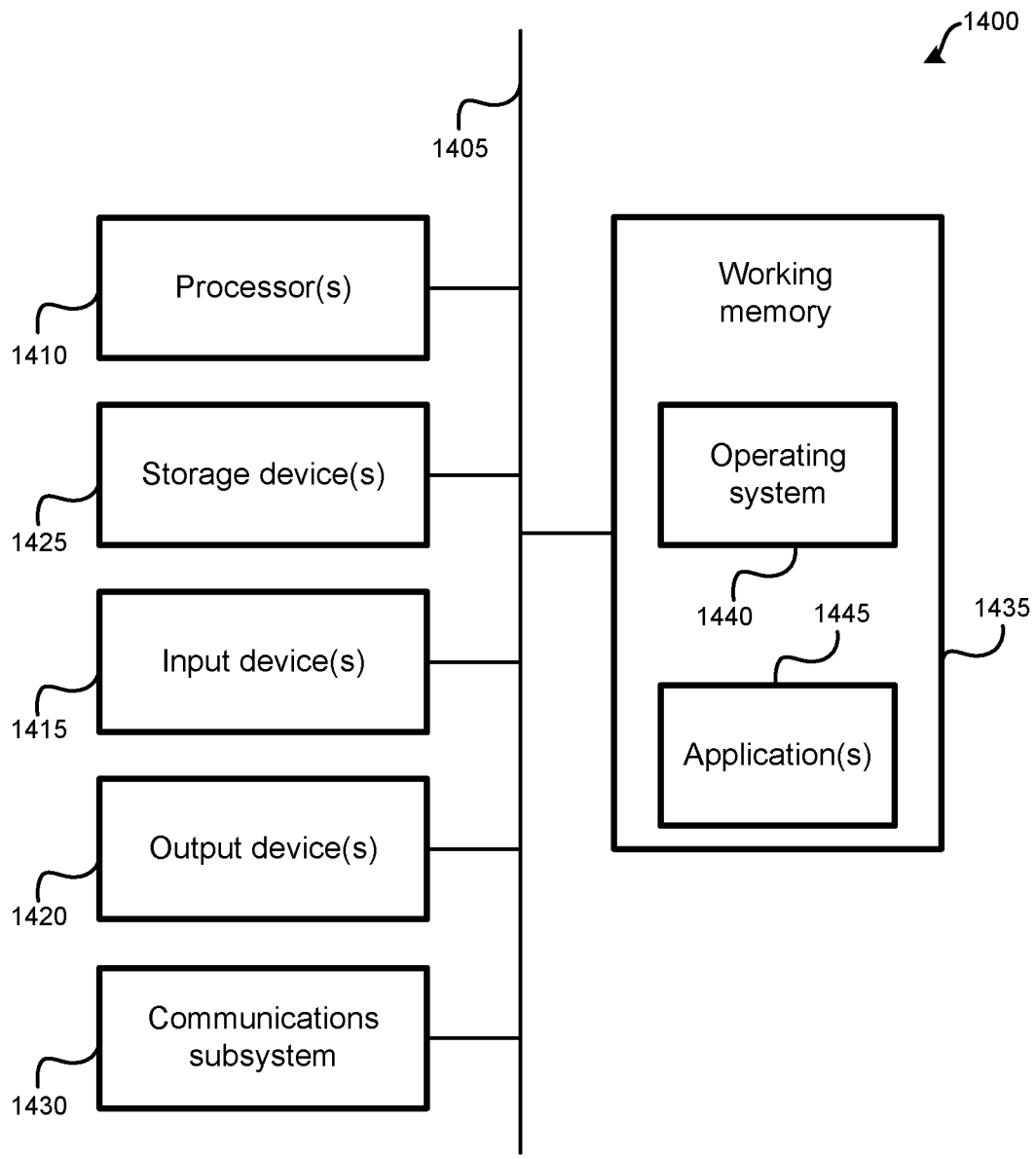
FIG. 14 illustrates an embodiment of a computer system.

A computer system as illustrated in FIG. 14 may be incorporated as part of the previously described computerized devices, such as the described television receivers and television distribution system. FIG. 14 provides a schematic illustration of one embodiment of a computer system 1400 that can perform various steps of the methods provided by various embodiments. It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, video decoders, and/or the like); one or more input devices 1415, which can include without limitation a mouse, a keyboard, remote control, and/or the like; and one or more output devices 1420, which can include without limitation a display device, a printer, and/or the like.

The computer system 1400 may further include (and/or be in communication with) one or more non-transitory storage devices 1425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1400 might also include a communications subsystem 1430, which can include without limitation a modem, a network card (wireless or wired), an infrared communication device, a wireless communication device, and/or a chipset (such as a Bluetooth™ device, an 1102.11 device, a WiFi device, a WiMax device, cellular communication device, etc.), and/or the like. The communications subsystem 1430 may permit data to be exchanged with a network (such as the network described below, to name one example), other computer systems, and/or any other devices described herein. In many embodiments, the computer system 1400 will further comprise a working memory 1435, which can include a RAM or ROM device, as described above.

The computer system 1400 also can comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1425 described above. In some cases, the storage medium might be incorporated within a computer system, such as computer system 1400. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1400) to perform methods in accordance with various embodiments of the invention. According to a set of embodiments, some or all of the procedures of such methods are performed by the computer system 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the non-transitory storage device(s) 1425. Merely by way of example, execution of the sequences of instructions contained in the working memory 1435 might cause the processor(s) 1410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1400, various computer-readable media might be involved in providing instructions/code to processor(s) 1410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1425. Volatile media include, without limitation, dynamic memory, such as the working memory 1435.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400.

The communications subsystem 1430 (and/or components thereof) generally will receive signals, and the bus 1405 then might carry the signals (and/or the data, instructions, etc. carried by the signals) to the working memory 1435, from which the processor(s) 1410 retrieves and executes the instructions. The instructions received by the working memory 1435 may optionally be stored on a non-transitory storage device 1425 either before or after execution by the processor(s) 1410.

It should further be understood that the components of computer system 1400 can be distributed across a network. For example, some processing may be performed in one location using a first processor while other processing may be performed by another processor remote from the first processor. Other components of computer system 1400 may be similarly distributed. As such, computer system 1400 may be interpreted as a distributed computing system that performs processing in multiple locations. In some instances, computer system 1400 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A television receiver comprising:
   one or more tuners communicatively coupled with a satellite antenna;
   one or more processors;
   a memory communicatively coupled with and readable by the one or more processors and having stored therein processor-readable instructions which, when executed by the one or more processors, cause the one or more processors to:
      monitor, via the one or more tuners, an occurrence of a solar conjunction event caused by the sun being substantially aligned with the satellite antenna through which the television receiver receives signals from one or more satellites;
      calculate a prediction of a future solar conjunction event based on the monitored occurrence of the solar conjunction event;
      monitor, via the one or more tuners, a second occurrence of the solar conjunction event caused by the sun being substantially aligned with the satellite antenna through which the television receiver receives signals from the one or more satellites;
      determine that the second occurrence of the solar conjunction event does not match the calculated prediction of the future solar conjunction event within a threshold range; and
      disable one or more features of the television receiver in response to determining that the second occurrence of the solar conjunction event does not match the calculated prediction of the future solar conjunction event within the threshold range.

2. The television receiver of claim 1, wherein the processor-readable instructions that cause the one or more processors to calculate the prediction of the future solar conjunction event comprises processor-readable instructions that cause the one or more processors to calculate a future date and a future time for the future solar conjunction event, wherein determining that the second occurrence of the solar conjunction event does not match the calculated prediction of the future solar conjunction event within the threshold range is at least partially based on the calculated future date and future time.

3. The television receiver of claim 1, wherein the processor-readable instructions, when executed, further cause the one or more processors to determine a location of the television receiver.

4. The television receiver of claim 2, wherein the location of the television receiver is based on stored user account information.

5. The television receiver of claim 2, wherein the processor-readable instructions, when executed, further cause the one or more processors to: based on the location, obtain an estimate for when the occurrence of the solar conjunction event is to occur.

6. The television receiver of claim 5, wherein the processor-readable instructions, when executed, further cause the one or more processors to start monitoring for the solar conjunction event based upon the obtained estimate for when the occurrence of the solar conjunction event is to occur.

7. The television receiver of claim 1, wherein the processor-readable instructions, when executed, further cause the one or more processors to:
record a duration of a programming stream disruption associated with the solar conjunction event.

8. The television receiver of claim 7, wherein the processor-readable instructions, when executed, further cause the one or more processors to:
record a second duration of the programming stream disruption associated with the second solar conjunction event.

9. The television receiver of claim 8, wherein the processor-readable instructions, when executed, further cause the one or more processors to: perform a comparison of the duration of the programming stream disruption associated with the solar conjunction event with the second duration of the programming stream disruption associated with the second solar conjunction event.

10. The television receiver of claim 8, wherein disabling the one or more features of the television receiver is further based on the comparison of the duration of the programming stream disruption associated with the solar conjunction event with the second duration of the programming stream disruption associated with the second solar conjunction event.

11. The television receiver of claim 1, wherein the processor-readable instructions that, when executed, cause the one or more processors to disable the one or more features of the television receiver comprise processor-readable instructions which, when executed, cause the one or more processors to output a message for presentation on a television that instructs a user to contact customer support of a service provider.

12. The television receiver of claim 1, further comprising a network interface, wherein the processor-readable instructions, when executed, further cause the one or more processors to alert a service provider via the network interface that the second occurrence of the solar conjunction event does not match the calculated prediction of the future solar conjunction event within the threshold range.

13. A method for utilizing solar conjunction events, comprising:
monitoring, via one or more tuners of a television receiver, an occurrence of a solar conjunction event caused by the sun being substantially aligned with a satellite antenna through which the television receiver receives signals from one or more satellites;
calculating a prediction of a future solar conjunction event based on the monitored occurrence of the solar conjunction event;
monitoring, via the one or more tuners of the television receiver, a second occurrence of the solar conjunction event caused by the sun being substantially aligned with the satellite antenna through which the television receiver receives signals from the one or more satellites;
determining that the second occurrence of the solar conjunction event does not match the calculated prediction of the future solar conjunction event within a threshold range; and
disabling one or more features of the television receiver in response to determining that the second occurrence of the solar conjunction event does not match the calculated prediction of the future solar conjunction event within the threshold range.

14. The method for utilizing solar conjunction events of claim 13, further comprising:
calculating a future date and a future time for the future solar conjunction event.

15. The method for utilizing solar conjunction events of claim 13, further comprising:
based on the location, obtaining an estimate for when the occurrence of the solar conjunction event is to occur.

16. The method for utilizing solar conjunction events of claim 15, further comprising:
initiating monitoring for the solar conjunction event based upon the obtained estimate for when the occurrence of the solar conjunction event is to occur.

17. The method for utilizing solar conjunction events of claim 13, further comprising:
recording a duration of a programming stream disruption associated with the solar conjunction event; and
recording a second duration of the programming stream disruption associated with the second solar conjunction event.

18. The method for utilizing solar conjunction events of claim 17, further comprising:
performing a comparison of the duration of the programming stream disruption associated with the solar conjunction event with the second duration of the programming stream disruption associated with the second solar conjunction event.

19. The method for utilizing solar conjunction events of claim 18, further comprising:
wherein disabling the one or more features of the television receiver is further based on the comparison of the duration of the programming stream disruption associated with the solar conjunction event with the second duration of the programming stream disruption associated with the second solar conjunction event.

20. A non-transitory processor-readable medium comprising processor-readable instructions that cause one or more processors of a television receiver to:
monitor, via one or more tuners of the television receiver, an occurrence of a solar conjunction event caused by the sun being substantially aligned with a satellite antenna through which the television receiver receives signals from one or more satellites;
calculate a prediction of a future solar conjunction event based on the monitored occurrence of the solar conjunction event;
monitor, via the one or more tuners, a second occurrence of the solar conjunction event caused by the sun being substantially aligned with the satellite antenna through which the television receiver receives signals from the one or more satellites;
determine that the second occurrence of the solar conjunction event does not match the calculated prediction of the future solar conjunction event within a threshold range; and
disable one or more features of the television receiver in response to determining that the second occurrence of the solar conjunction event does not match the calculated prediction of the future solar conjunction event within the threshold range.

* * * * *